(12) United States Patent
Koch-Fienberg et al.

(10) Patent No.: US 12,400,009 B2
(45) Date of Patent: Aug. 26, 2025

(54) ASSIGNING A LIMITED ACCESS STATE TO AN ACCOUNT THAT RETAINS FULL NAVIGABLE ACCESS TO A CLIENT APPLICATION

(71) Applicant: Chime Financial, Inc., San Francisco, CA (US)

(72) Inventors: Yona Koch-Fienberg, Oakland, CA (US); Sidney Shou Chien Ho, Los Angeles, CA (US); Zara Gustad Wittirani, San Francisco, CA (US); Charles Roland Kirk, Chicago, IL (US); Brian Mullins, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 185 days.

(21) Appl. No.: 18/457,710

(22) Filed: Aug. 29, 2023

(65) Prior Publication Data

US 2025/0077688 A1    Mar. 6, 2025

(51) Int. Cl.
*G06F 9/451* (2018.01)
*G06F 21/60* (2013.01)

(52) U.S. Cl.
CPC ............ *G06F 21/604* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2016/0012445 A1* | 1/2016 | Villa-Real | G06Q 20/4016 705/44 |
| 2022/0005043 A1* | 1/2022 | Cao | G06Q 20/389 |

* cited by examiner

*Primary Examiner* — Cai Y Chen
(74) *Attorney, Agent, or Firm* — Keller Preece PLLC

(57) ABSTRACT

The present disclosure relates to systems, non-transitory computer-readable media, and methods for assigning a limited access state to an account based on a triggering event and causing a client device to provide full navigable access to a client application. For example, in one or more embodiments, the disclosed system detects a triggering event corresponding with activity of an account. In particular, based on the detected triggering event, the disclosed system assigns the limited access state to the account and provides a notification to the account in the limited access state. Furthermore, while in the limited access state the client device associated with the account in the limited access state provides full navigable access to the client application, detects restricted activity based on restriction rules, and provides graphical elements to restore the account from the limited access state to a full access state.

20 Claims, 14 Drawing Sheets

ASSIGNING A LIMITED ACCESS STATE TO AN ACCOUNT THAT RETAINS FULL NAVIGABLE ACCESS TO A CLIENT APPLICATION

BACKGROUND

Recent years have seen significant improvements in utilizing computing devices to facilitate transactions and events associated with financial transactions. One event associated with transactions is suspending accounts for suspicious or fraudulent activity. For example, conventional systems can suspend an account based on the account performing activities deemed indicative of illegal or fraudulent activity. In particular, conventional systems remove a user of the account's ability to make transactions within their account. In doing so, conventional systems prevent further illegal or fraudulent activity from occurring. To illustrate, conventional systems often reach out to a user of the account to either confirm or dispel suspicions related to the account.

One reason conventional systems suspend accounts is to stop users of an account from conducting additional suspicious activity. Indeed, conventional systems suspend accounts to avoid legal trouble. For example, a potential bad actor may receive a wire transfer in which conventional systems are suspicious of (due to the amount—potentially indicating money laundering). In response to this suspicion, conventional systems halt transfers in or out of the account associated with the potential bad actor. Accordingly, in conventional systems suspending suspicious accounts is a nuisance for users of the account but a necessary precaution to stop additional potential suspicious activity and to avoid legal troubles.

Indeed, because conventional systems suspend accounts in response to potential suspicious activity, conventional systems have a number of disadvantages in relation to a user experience within a graphical user interface, efficiency, and flexibility. For example, in the event a user of an account has a bonafide transaction (or a series of bona fide transactions) but is suspected of potential suspicious activity, conventional systems would suspend the user's account. With respect to conventional systems and a client application, the user of the suspended account must go through a time-consuming process of communicating with conventional systems as well as not having access to financial transaction capabilities within their account. Accordingly, suspension of accounts in conventional systems is computationally inefficient and inflexible.

BRIEF SUMMARY

This disclosure describes one or more embodiments of methods, non-transitory computer-readable media, and systems that can solve the foregoing problems in addition to providing other benefits by assigning to an account, based on a triggering event, a limited access state to the account that restricts usage of the account with restriction rules but provides for full navigable access to a client application. For example, the disclosed systems detect the triggering event that corresponds with activity of an account and based on the detected triggering event, the disclosed systems assign a limited access state. In particular, the limited access state restricts usage compared to a full access state of the account. To illustrate, when a client device associated with the account is in the limited access state, the disclosed systems cause the client device to provide full navigable access of the client application (regarding features and accessibility with restriction rules that impose certain limitations on transactions) and provides indications on how to perform actions to move the account from the limited access state to the full access state.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
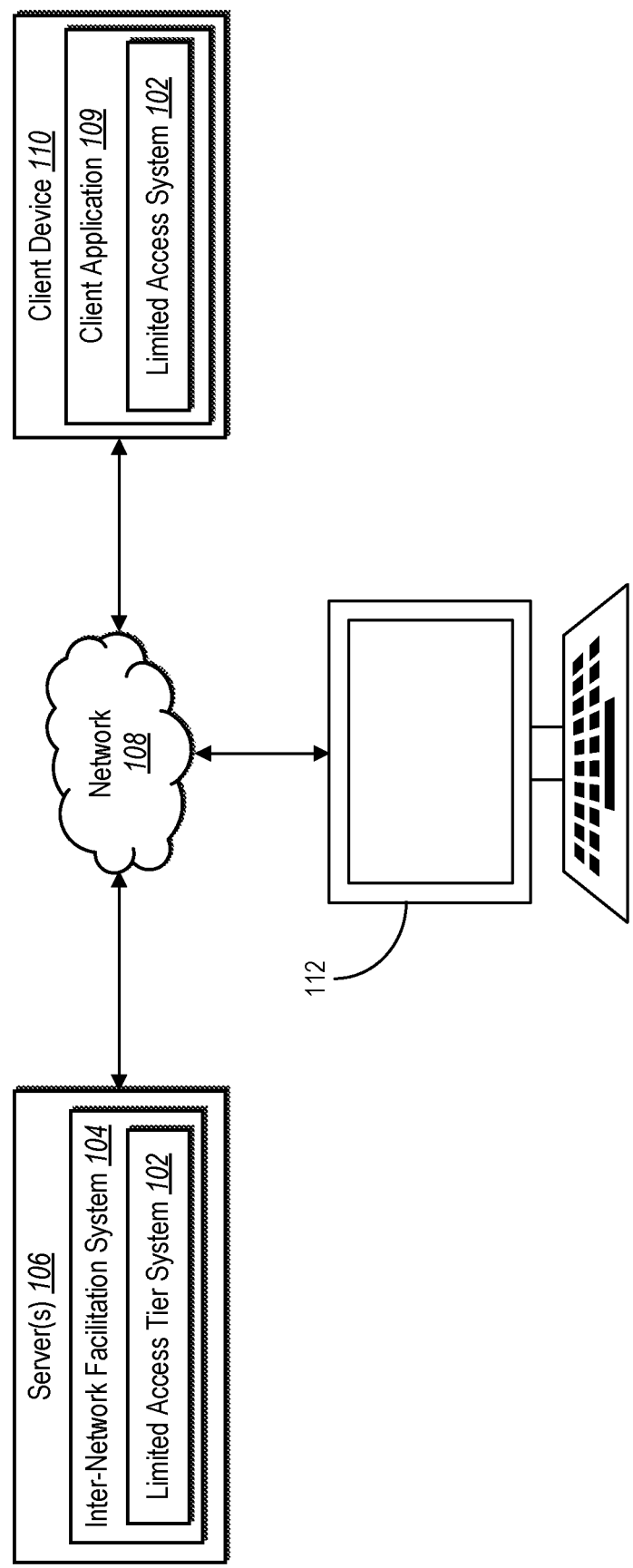
FIG. 1 illustrates a block diagram of an environment for implementing a limited access tier system in accordance with one or more embodiments.

This disclosure describes one or more embodiments of a limited access tier system that detects a triggering event, assigns based on the triggering event a limited access state to an account, causes a client device to provide full navigable access, detect restricted activity and provide an indication on moving the account from a limited access state to a full access state. For example, the limited access tier system provides a low-risk alternative state to suspending an account by assigning the account to the limited access state. In particular, users of an account in the limited access state can access their funds, receive direct deposits, and perform other account-based activities as opposed to a suspended account, which does not allow for those actions. Further, the limited access tier system applies restrictions rules to the account that restricts usage of the account compared to a full access state. To illustrate, in the limited access state, the limited access tier system still allows for full navigable access to the client application (a user can fully navigate and perform any account-based activities), but the limited access tier system can impose restrictions such as reducing a threshold related to deposits or spending in the account. Furthermore, the limited access tier system via a client device provides graphical instructions within a client application for moving the account from the limited access state to a full access state.

As mentioned above, the limited access tier system detects a triggering event. For example, the limited access tier system detects a triggering event in response to receiving a data package corresponding with activity of an account. In particular, the limited access tier system determines that the activity of the account within the data package indicates suspicious activity. To illustrate, the limited access tier system deems activity suspicious if it is suspected of illegal, fraudulent, or unusual activity.

In addition to detecting a triggering event for activity indicative of suspicious activity, in one or more example embodiments, the limited access tier system detects a triggering event for a new account. In particular, the limited access tier system detects a triggering event for the new account when the new account fails to satisfy a verification threshold. To illustrate, the limited access tier system determines that the new account fails to upload certain identifying documents.

As also mentioned, the limited access tier system applies restriction rules. For example, the limited access tier system applies restriction rules to an account assigned to the limited access state. In particular, the restriction rules, in the limited access state limit the account in performing certain functions but allow for a user of the client device associated with the account to fully navigate and perform application-based actions. To illustrate, restriction rules include reducing an overall spending threshold for the account, reducing a direct deposit threshold for the account, reducing an inter-account transfer threshold for the account, reducing a machine withdrawal threshold for the account, reducing a credit spending threshold for the account, reducing a debit spending threshold for the account, and reducing feature capabilities within the client application.

As mentioned above, the limited access tier system can reassign the account from the limited access state to the full access state. For example, the limited access tier system in one or more implementations sends a verification request corresponding with a triggering event to the client device associated with the account. In particular, the limited access tier system can receive uploaded verification from the client device associated with the account and process the verification. To illustrate, the limited access tier system determines that the uploaded verification satisfies a threshold for verification corresponding with the triggering event and restores the account to the full access state in response to the satisfaction of the threshold. Furthermore, the limited access tier system restores the account to the full access state by deactivating restriction rules.

As just mentioned, the limited access tier system sends verification requests corresponding with a triggering event. For example, the limited access tier system sends a verification request to a client device associated with an account. In particular, the limited access tier system provides a direct upload option to the client device associated with the account in addition to sending the verification request. To illustrate, the limited access tier system provides the direct upload option within a client application of the client device to satisfy the verification threshold.

In addition to the above, the limited access tier system utilizes time thresholds with the limited access state. For example, the limited access tier system associates a first time threshold with the limited access state that represents a time period within which a verification threshold is to be satisfied. In particular, if the limited access tier system determines that the verification threshold is satisfied within the first time threshold, the limited access tier system restores the account from the limited access tier system to the full access state.

Furthermore, in one or more example embodiments, prior to expiration of the first time threshold, the limited access tier system sends notifications. In particular, the limited access tier system sends a reminder notification to the client device associated with the account. To illustrate, the reminder notification includes an indication of the first time threshold to satisfy the verification threshold.

Additionally, the limited access tier system can assign the account to a suspension state. For example, a client device associated with the account receives a verification request corresponding with a triggering event from the limited access tier system. In particular, the limited access tier system determines that the first time threshold for satisfaction of the verification threshold is not satisfied. To illustrate, based on the verification threshold not being satisfied within the first time threshold, the limited access tier system reassigns the account from the limited access state to a suspension state.

Moreover, the limited access tier system can provide a second time threshold. For example, the limited access tier system provides a second time threshold within which to satisfy the verification threshold. In particular, for the suspension state, the limited access tier system associates a second time threshold with the suspension state. To illustrate, if the limited access tier system determines that the verification threshold was not satisfied within the second time threshold, then the limited access tier system updates the state of the account from the suspension state to a closure state.

Accordingly, because the limited access tier system can apply restriction rules to a limited access state of the account and cause the client device to provide full navigable access to a client application, the limited access tier system is more efficient to conventional systems in a number of ways. For example, the limited access tier system improves the graphical user interface of the client application for a user associated with the account in the limited access state. In particular, rather than suspending the account and halting all transfers in or out of the account, the limited access tier system can continue to provide fully navigable access within the graphical user interface to the client application. To illustrate, as opposed to conventional systems (where many features are greyed-out or disabled within the graphical user interface), in the limited access tier system, a user of the client application can access all features and in-application actions. In the graphical user interface of the client application for the limited access tier system, the user can transfer money, deposit money, etc., and the limited access tier system merely applies restrictions such as lowering the amount of money allowed to be deposited. This allows the client device associated with the account in the limited access state to operate efficiently with minimal restrictions by utilizing a fully navigable graphical user interface within the client application, despite having a triggering event associated with its account.

In addition, the limited access tier system improves upon efficiency by not suspending the account associated with a triggering event outright. For example, as discussed above, the limited access tier system assigns the limited access state to the account which still provides for full navigable access to a client application. In particular, as compared to conventional systems (where an account with suspicious activity is suspended), the limited access tier system assigns a middle-ground limited access state to the account to apply pressure to a user associated with the account to dispel any suspicions (by submitting verification). If the user associated with the account can dispel the suspicions, then the limited access tier system restores the account to the full access state. In doing so, the limited access tier system improves upon efficiency by not completely suspending an account. Rather the limited access tier system provides the limited access state to allow the account to operate normally with minimal restrictions until a user of the account uploads verification or documentation to satisfy a threshold requirement. The limited access state places pressure on a user associated with the account but does not suspend the account and require a lengthy process for restoring the account.

Moreover, the limited access tier system also improves efficiency by providing a direct upload option within the graphical user interface. In particular, suspensions in conventional systems generally require extensive communication between conventional systems and the suspended account before restoration of the suspended account, however the limited access tier system assigns the account in the limited access state and directly provides within a graphical user interface of the client device a direct upload option. To illustrate, the direct upload option allows the user associated with the account to directly upload required verification to dispel any suspicions.

In addition to the efficiency improvements, the limited access tier system improves upon flexibility. For example, the limited access tier system flexibly allows for a user associated with an account that corresponds with a triggering event to continue to operate with minimal restrictions. In particular, the user associated with the account can still spend money, deposit money, transfer money, and perform other actions within the client device. The limited access tier system requires verification via the client application or documentation to be uploaded to be restored to the full access state, but while awaiting the required verification or documentation, a user associated with the account can still have full access to the client application. The limited access tier system provides flexibility via the limited access state as a reasonable middle ground state for accounts to operate within when a triggering event is detected that corresponds with an account.

Additional detail regarding limited access tier system will now be provided with reference to the figures. In particular, FIG. 1 illustrates a block diagram of a system environment for implementing a limited access tier system 102 in accordance with one or more embodiments. As shown in FIG. 1, the environment includes server(s) 106 implementing the limited access tier system 102 as part of an inter-network facilitation system 104. The environment of FIG. 1 further includes a client device 110, a client application 109, and an agent device 112. The server(s) 106 can include one or more computing devices to implement the limited access tier system 102. Additional description regarding the illustrated computing devices (e.g., the server(s) 106, and the client device 110) is provided with respect to FIGS. 8-9 below.

As shown, the limited access tier system 102 utilizes the network 108 to communicate with the client device 110, the agent device 112 and/or the server(s) 106. The network 108 may comprise a network as described in relation to FIGS. 8-9. For example, the limited access tier system 102 communicates with the client device 110 to provide and receive information pertaining to various client transactions and communicates with the agent device 112 for processing the state of an account for the client device 110. Indeed, the inter-network facilitation system 104 or the limited access tier system 102 can assign a limited access state to the account.

As described in greater detail below (e.g., in relation to FIG. 8), the inter-network facilitation system 104 can manage interactions across multiple devices, providers, and computer systems. For example, the inter-network facilitation system 104 can execute transactions across various third-party systems such as a banking entity, automated transaction machines, or payment providers. The inter-network facilitation system 104 can also maintain and manage digital accounts for client devices/users to store, manage, and/or transfer funds to other users. For example, the inter-network facilitation system 104 provides information to the client device 110 such as direct deposit status, transaction information, digital account updates, device fee information, check status, interaction history, transaction status, activation, etc.

As indicated by FIG. 1, the client device 110 includes the client application 109. In particular, the client application 109 can include a web application, a native application installed on the client devices 110 (e.g., a mobile application, a desktop application, etc.), or a cloud-based application where all or part of the functionality is performed by the server(s) 106. In some embodiments, the inter-network facilitation system 104 or the limited access tier system 102 communicates with the client device 110 through the client application 109. This communication for example, receives and provides account information and transaction information including direct deposit status, digital account updates, device fee information, check status, interaction history, transaction status, activation, etc. As shown, the limited access tier system 102 can provide digital account information and secured account information for display within a graphical user interface associated with the client application 109.

As shown in FIG. 1, the client device 110 implements the client application 109 in conjunction with interaction with the inter-network facilitation system 104 or the limited access tier system 102. For example, the inter-network facilitation system 104 or the limited access tier system 102 can monitor the activities of the client application 109. In particular, these activities can include events such as transactions, transfers, deposits, time spent on client application 109, recently viewed pages on client application 109, recently viewed transaction on the client application 109, attempted dispute requests, etc.

Although FIG. 1 illustrates the environment having a particular number and arrangement of components associated with the limited access tier system 102, in some embodiments, the environment may include more or fewer components with varying configurations. For example, in some embodiments, the inter-network facilitation system 104 or the limited access tier system 102 can communicate directly with the client device 110, client application 109, and/or the agent device 112, bypassing the network 108. In these or other embodiments, the inter-network facilitation system 104 or limited access tier system 102 can be implemented (entirely on in part) on the client device 110. Additionally, the inter-network facilitation system 104 or the limited access tier system 102 can include or communicate with a database for storing information, such as recent direct deposits, ATM withdrawals, debit, or credit transactions, pending transactions, digital account updates, interaction history, and/or other information described herein.

Figure 2:
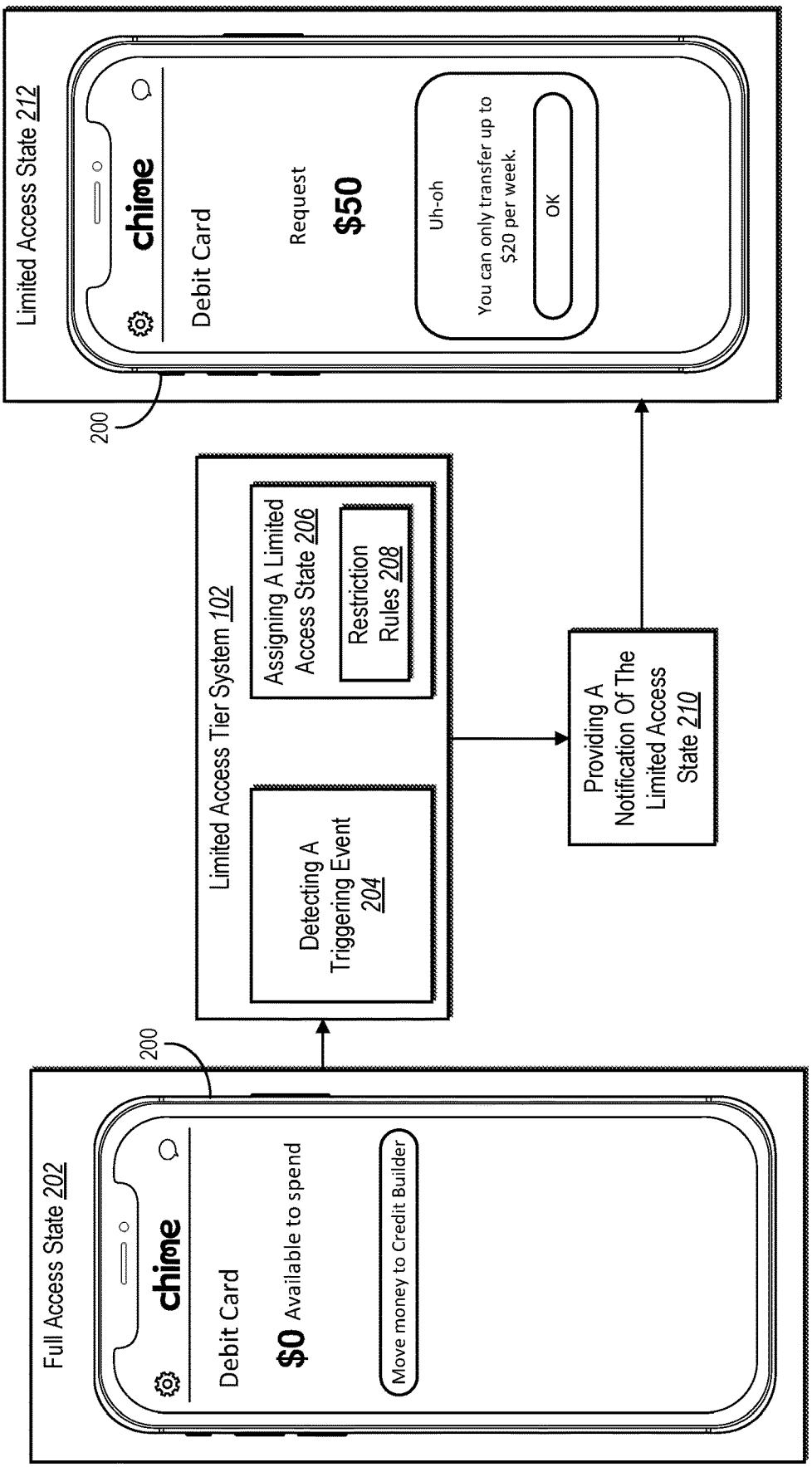
FIG. 2 illustrates an example overview diagram of the limited access tier system assigning a limited access state to an account in accordance with one or more embodiments.

As discussed above, the limited access tier system 102 can interact with the client device 110 to assign an account associated with the client device 110 to a limited access state. For example, FIG. 2 illustrates an overview of the limited access tier system 102 detecting a triggering event 204, performing an act 206 and a client device 200 being in a limited access state 212. In one or more example embodiments, as shown in FIG. 2, the limited access tier system 102 provides for display a user's account information and transactional features. In particular, the limited access tier system 102 provides the display on a graphical user interface of the client device 200. To illustrate, via a client application (e.g., client application 109) from the graphical user interface, a user of the account via the client device 200 can check their balance, transfer money to other accounts, make direct deposits, read articles with instructions to perform a variety of action within the client application, or perform any other financial transaction features available on the client application.

As shown in FIG. 2, the limited access tier system 102 has the client device 200 assigned to a full access state 202. In some embodiments, the limited access tier system 102 assigns by default the client device 200 to the full access state 202. In other embodiments, the limited access tier system 102 can restore the account to the full access state 202. As used herein, the term "full access state" 202 in one or more implementations refers to a state of the account that is neither limited nor suspended. In particular, the full access state 202 includes the limited access tier system 102 providing feature, function, and graphical user interface accessibility to a user without any restriction rules applied. To illustrate, as compared to the limited access state 212, the full access state 202 has no limitations such as only allowing for a transfer of $20 per week nor limitations such as only allowing for a direct deposit of $100 per month. Rather, the full access state 202 allows the user associated with the account to not only fully access all navigable features on the account, but also not be restricted in spending, depositing, and transferring.

As further shown in FIG. 2, the limited access tier system 102 detects the triggering event 204. For example, the limited access tier system 102 monitors activity from the client device 200, receives an indication of the triggering event 204 from the client device 200, or receives an indication from an agent device regarding the presence of the triggering event 204. In particular, the limited access tier system 102 in response to detecting the triggering event 204 performs additional actions. More details regarding the detection of triggering events, monitoring activity, and receiving indications of triggering events is given below in the description of FIGS. 3A-3B.

As just mentioned, in response to detecting the triggering event 204, the limited access tier system 102 performs additional actions. For example, the additional actions include the act 206 of assigning the limited access state 212. In particular, the act 206 of assigning the limited access state 212 involves the limited access tier system 102 sending a data package to the client device 200 associated with the account corresponding to the triggering event 204. To illustrate, the data package sent to the client device 200 detects actions taking within the client application of the client device 200. More details of the act 206 of assigning the limited access state 212 to an account is given below in the description of FIGS. 3A-3B.

As also shown in FIG. 2, in addition to the act 206 of assigning the limited access state 212, the limited access tier system 102 applies restriction rules 208. For example, the restriction rules 208 correspond with the limited access state 212. In particular, the restriction rules 208 act as system-wide safeguards prior to restoring an account from the limited access state 212 to the full access state 202. More details regarding applying restriction rules are given in FIG. 4.

As also mentioned earlier, the limited access tier system 102 provides notifications to the client device 200 regarding the limited access state 212. As used herein, the term "notification" refers to an indicator sent to one or more client devices associated with an account in the limited access state. In particular, the notification includes an in-application indication or an email indication regarding the limited access state of the account. To illustrate, the indication may include a graphical element indication within the application notifying the user of the limited access state or the indication may include an email detailing the limited access state.

For example, FIG. 2 shows the limited access tier system 102 performing an act 210 of providing a notification of the limited access state. In particular, the limited access tier system 102 can send an in-application notification or an email to the client device 200 associated with the account corresponding with the triggering event 204. More details regarding the limited access tier system 102 performing the act 210 of providing notifications of the limited access state is given below in the description of FIGS. 6A-6E.

As shown in FIG. 2, the limited access tier system 102 has the client device 200 associated with the account corresponding with the triggering event 204 in the limited access state 212. As mentioned above, the limited access tier system 102 assigns the limited access state 212 to the account based on triggering events. As used herein, the term "limited access state" 212 in one or more implementations refers to a state of the account associated with the triggering event 204, wherein the state has restrictions and limitations. In particular, the limited access state 212 includes the limited access tier system 102 not suspending the account and providing feature, function, and graphical user interface accessibility to a user of the account associated with the triggering event 204. In providing feature, function, and graphical user interface accessibility, the limited access state 212 still has restrictions when certain actions are performed by a user of the account associated with the triggering event. To illustrate, for example, the limited access state 212 lowers the spending amount and direct deposit amount to $100 each. More details regarding the limited access state 212, time thresholds, and verification thresholds is given below in the description of FIG. 5.

Figure 3A:
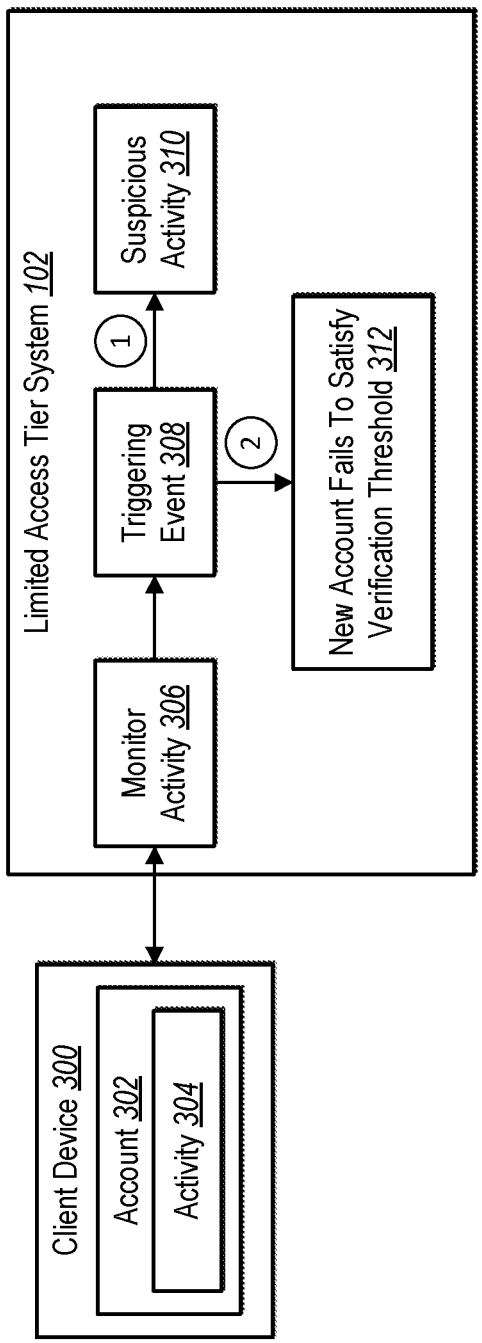
FIG. 3A-3B illustrates an example diagram of the limited access tier system monitoring activity of an account to determine a triggering event in accordance with one or more embodiments.

As mentioned above, the limited access tier system 102 monitors activity of a client device to detect triggering events. As shown in FIG. 3A, the limited access tier system 102 performs an act 306 of monitoring activity of a client device 300 and detects different triggering events. For example, FIG. 3A illustrates the client device 300 associated with an account 302, wherein activity 304 is performed that corresponds with the account 302 and the client device 300. In particular, the activity 304 includes transactions such as transferring money to a different account, sending money to a co-user, spending money from a credit account, spending money from a debit account, withdrawing money from an ATM machine, receiving a direct deposit, updating personal information, searches within the interface of the client application, and other financial transaction actions or in-application actions. To illustrate, the activity 304 includes a user of the client device 300 associated with the account 302 performs an act of depositing a large amount of money into the account 302.

As already mentioned, the limited access tier system 102 performs the act 306 of monitoring activity. As mentioned in relation to detecting triggering events, more details relating to the limited access tier system 102 monitoring activity is given in the description of FIG. 3B. In response to the limited access tier system 102 performing the act 306 of monitoring activity, the limited access tier system 102 determines a triggering event 308. As used herein, the term "triggering event" 308 in one or more implementations refers to activity corresponding with an account that causes the limited access tier system 102 to perform actions. In particular, triggering event 308 includes any activity deemed by the limited access tier system 102 as suspicious or in some embodiments, deemed by the limited access tier system 102 as a new account with insufficient verification. To illustrate, the triggering event 308 includes deposits over a certain limit, transfers over a certain limit, excessive spending within a specified period, attempts to surpass credit limits, failure to provide picture identification, failure to provide proof of residency, insufficient personal identification documents, and other patterns of activity that are indicative of suspicious activity. The limited access tier system 102 detects the occurrence of the triggering events and performs subsequent actions.

As mentioned above (and as illustrated in FIG. 3A), one indication of the triggering event 308 includes suspicious activity 310. As used herein, the term "suspicious activity" 310 in one or more implementations refers to the limited access tier system 102 receiving data packages that indicate suspicious activity such as fraud, illegality, or unusual activity. In particular, the limited access tier system 102 can determine suspicious activity 310 in response to a transaction that is unlike other transactions on the account, a deposit that exceeds a normally deposited amount, or a large one-time transfer to another account. In some embodiments, the limited access tier system 102 utilizes a machine-learning model to detect suspicious activity 310. To illustrate, the limited access tier system 102 designates any activity as suspicious activity 310 when the limited access tier system 102 determines there is a high probability of fraud or illegality.

As also indicated in FIG. 3A, the limited access tier system 102 can also determine the triggering event 308 as a new account 312 that fails to satisfy a verification threshold. For example, the limited access tier system 102 can designate the new account 312 as less than one month old or an account with activity below a certain threshold. In particular, with new accounts, the limited access tier system 102 generally requires providing identifying documents. The identifying documents assist the limited access tier system 102 in preventing fraudulent, illegal, and unusual activity. To illustrate, the new account 312 that fails to satisfy a verification threshold, such as providing identifying documents (driver's license, proof of address, etc.) is designated by the limited access tier system 102 as the triggering event 308. Subsequently, the limited access tier system 102 assigns the new account 312 that fails to satisfy the verification threshold to the limited access state. Furthermore, allowing for the new account 312 to operate in the limited access state further improves upon efficiency because the new account 312 can still perform financial transactions while the limited access tier system 102 is awaiting submission of additional verification.

Figure 3B:
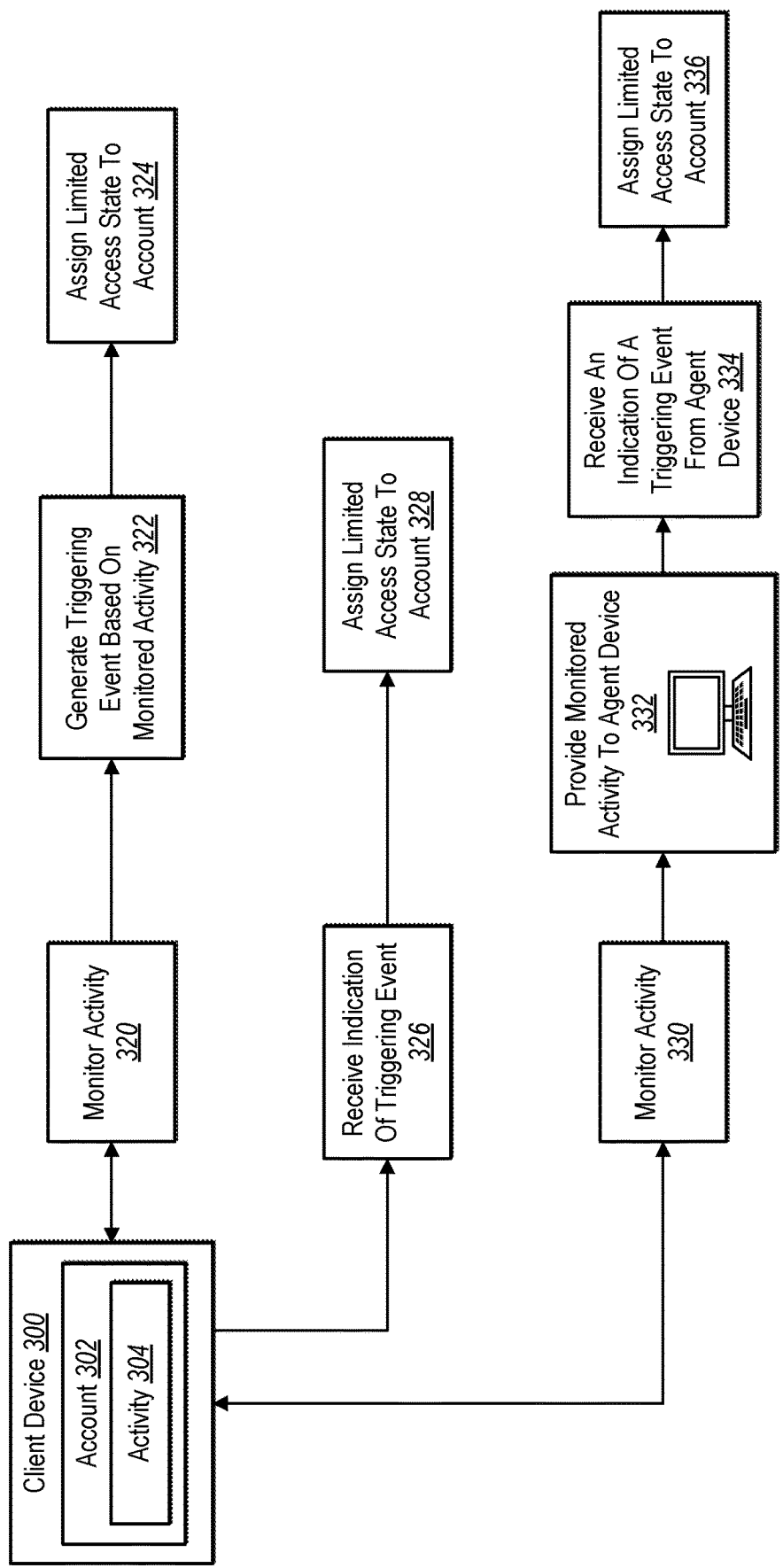

As outlined above, FIG. 3A shows different triggering events such as suspicious activity 310 and the new account 312 that fails to satisfy the verification threshold. FIG. 3B details the limited access tier system 102 detecting the triggering event 308 and assigning the account to the limited access state. As illustrated in FIG. 3B, the limited access tier system 102 in one or more embodiments can utilize three different methods for detecting the triggering event 308. For example, in one or more implementations, the limited access tier system 102 performs an act 320 of directly monitoring activity of the account 302. In particular, the act 320 includes the limited access tier system 102 receiving data packages of all activity 304 from the client device 300. To illustrate, the limited access tier system 102 receives the data packages of activity 304 of the account 302 as machine-readable codes. In some embodiments, the limited access tier system 102 pre-designates certain machine-readable codes as indicating the triggering event 308. To further illustrate, the limited access tier system 102 receives a machine-readable code designated as the triggering event 308 and causes the limited access tier system 102 to execute further actions to assign the account 302 in the limited access state.

In one or more example embodiments, the limited access tier system 102 utilizes machine learning to determine whether the activity 304 corresponding with the account 302 is the triggering event 308. As used herein, the term "machine-learning model" refers to a machine-learning model trained or used to determine whether activity 304 corresponding with the account 302 is likely or unlikely to be the triggering event 308. In some cases, the machine-learning model refers to a trained machine-learning model that generates a likelihood score of the activity 304 being the triggering event 308. For example, the machine-learning model can utilize a series of gradient boosted decision trees (e.g., XGBoost algorithm), while in other cases, the machine-learning model is a random forest model, a multi-layer perceptron, a linear regression, a support vector machine, a deep tabular learning architecture, a deep learning transformer (e.g., self-attention-based-tabular transformer), or a logistic regression.

As just mentioned, the limited access tier system 102 can utilize a machine-learning model. The limited access tier system 102 can utilize the machine-learning model to determine whether the activity 304 indicates the triggering event 308 by inputting the activity 304 into the machine-learning model. For example, the machine-learning model can receive activities of an account that drive the likelihood of the triggering event 308, e.g., suspicious activity. In some instances, activities that drive the likelihood of the triggering event 308 includes transactions that involve a large amount of money, patterns of the account 302 that deviate from normal, a high number of transactions within a short period, or any other actions that involve the account 302 interacting with other accounts deemed suspicious. In particular, the limited access tier system 102 can utilize the machine-learning model to analyze the activity 304 and/or the account 302. For example, the limited access tier system 102 can encode information associated with the activity 304 and/or account 302, (e.g., using one hot encoding, an encoding layer, or a vector mapping) and then process the encoding utilizing the machine-learning model to generate a likelihood score of the activity 304 indicating the triggering event 308.

As further illustrated by FIG. 3B, the limited access tier system 102 performs an act 322 of generating a triggering event based on the monitored activity 320. For example, performing the act 322 of generating a triggering event includes the aforementioned pre-designated machine-readable codes as triggering events. In particular, the limited access tier system 102 receives the monitored activity 320 of the account 302 as data packages and processes the activity 304. Based upon processing the activity 304, the limited access tier system 102 determines different data packages correlate with different machine-readable codes. The limited access tier system 102 then determines whether the machine-readable codes correspond with triggering events. To illustrate, the limited access tier system 102 determines the activity 304 corresponds with triggering events and performs the act 322 of generating the triggering event 308 based on the monitored activity 320. Furthermore, generating the triggering event includes the limited access tier system 102 sending a data package to all client device(s) and agent device(s) associated with the account 302 that indicates the activity 304 corresponds with one or more triggering events.

As just mentioned, the limited access tier system 102 performs the act 322 of generating the triggering event 308 based on the monitored activity 320. In doing so, this further causes the limited access tier system 102 to activate the limited access state for the account 302. In particular, the limited access tier system 102 performs an act 324 of assigning the limited access state to the account 302. To illustrate, when the client device 300 performs an action within the client application, the limited access tier system 102 receives an indication of the attempted action, determines whether the account 302 is assigned to the limited access state, and based on the account 302 being assigned to the limited access state, the limited access tier system 102 restricts actions such as by lowering the amount allowed to be transacted.

As further shown in FIG. 3B, the limited access tier system 102 can perform an act 326. For example, the act 326 includes receiving an indication of the triggering event 308. In particular, receiving an indication of the triggering event 308 includes the client device 300 associated with the account 302 sending an indication to the limited access tier system 102 of the triggering event 308. To differentiate from the act 320 of the limited access tier system 102 directly monitoring activity of the client device 300, the act 326 of receiving an indication comes from the client device 300 while the act 320 of monitoring activity merely receives data packages from the client device 300 in which the limited access tier system 102 processes to determine whether it indicates the triggering event 308. To illustrate, the client device 300 via the client application can have automatic indications of activity that includes triggering events. For example, in one or more implementations, if the client device associated with the account 302 receives a deposit over $10,000, this triggers the client application to automatically send from the client device 300 an indication of the triggering event 308. Rather than the limited access tier system 102 monitoring activity of the client device 300, the client device 300 via the client application automatically sends an indication of the triggering event 308 to the limited access tier system 102 when certain actions occur.

Furthermore, based on the limited access tier system 102 performing the act 326, the limited access tier system 102 assigns the limited access state to the account. For example, the limited access tier system 102 performs an act 328 of assigning the limited access state to the account based on receiving an indication of the triggering event from the client application via the client device 300. The act 324 of assigning the limited access state was already discussed above, here the act 328 involves the same principles, it merely applies for the act 326 of receiving the indication of the triggering event.

As further shown in FIG. 3B, the limited access tier system 102 can perform an act 330 of monitoring activity. For example, the act 330 of monitoring activity can differ from the act 320 of monitoring activity due to the limited access tier system 102 performing a subsequent act 332 of providing the monitored activity to an agent device. In particular, the limited access tier system 102 performs the act 330 of monitoring activity by receiving data packages from the client device 300 associated with the account 302. Rather than processing the data packages from the client device 300, the limited access tier system 102 sends the data packages (indicative of the client device 300 associated with the account 302's activity 304) to one or more agent devices. To illustrate, the act 332 of providing the monitored activity to the agent device involves the agent device determining whether the activity 304 is a triggering event. In this instance, an agent of the agent device can manually flag certain accounts as including the triggering event 308. Moreover, the process of manual flagging by an agent of the agent device can include the agent of the agent device determining whether the account 302 provides verification that satisfies a verification threshold (discussed in more detail below).

In one or more example embodiments, prior to the act 332 of providing monitored activity to the agent device, the limited access tier system 102 processes the monitored activity of the client device 300. In particular, the limited access tier system 102 sends the processed monitored activity to the agent device(s) with the likelihood scores (indicating the likelihood of the activity 304 being the triggering event 308) and an agent of the agent device determines whether the activity 304 should indicate the triggering event 308. To illustrate, the agent device can determine to directly contact a user of the account 302 based on the processed data packages from the limited access tier system 102.

In other example embodiments, the limited access tier system 102 sends unprocessed data packages from the client device 300 to the agent device. In particular, the agent devices can determine to utilize machine learning models that indicate to the agent device potential suspicious activity. To illustrate, in response to the agent device receiving data packages with a plurality of activity from the client device 300 associated with the account 302, an agent of the agent device can activate a machine learning model for an identified set of activity to determine a likelihood score of the set of activity indicating one or more triggering event(s). Based on utilizing a machine-learning model, the agent of the agent device can determine the activity indicates a triggering event.

Furthermore, in addition to the act 332 of the limited access tier system 102 providing the monitored activity to the agent device, the limited access tier system 102 performs an act 334. In particular, the act 334 includes the limited access tier system 102 receiving an indication of the triggering event 308 from the agent device. As outlined above, the agent device can determine whether activity 304 indicates the triggering event 308 and in doing so sends an indication of the triggering event 308 to the limited access tier system 102. To illustrate, the agent device sends to the limited access tier system 102 an account identifier with a machine-readable code for the triggering event 308 associated with the account 302.

As shown in FIG. 3B, after the limited access tier system 102 receives an indication of the triggering event 308 from the agent device, the limited access tier system 102 performs an act 336. In particular, the act 336 includes assigning a limited access state to the account. The act 324 and 328 were discussed above for assigning the limited access state to the account 302. To illustrate, the act 336 of assigning the limited access state involves the same principles however the limited access tier system 102 performs the act 336 in response to the act 334 of receiving an indication of the triggering event from the agent device.

In one or more example embodiments, the limited access tier system 102 in performing the act 336 of assigning the limited access state to the account causes the client device 300 to provide fully navigable access. As used herein, the term "full navigable access" in one or more implementations refers to the limited access tier system 102 providing a client device associated with the account normal operating capabilities within the client application of the account. In particular, the aforementioned restrictions only apply when a certain action is detected such as transferring, spending, or depositing money. To illustrate, the limited access tier system 102 still allows a user to fully navigate the client application and perform operations as the user typically would be able to. However, when the user of the account 302 in the limited access state goes to transfer, spend, or deposit money, the limited access tier system 102 restricts the user from transferring, spending, or depositing money over a certain limit. Accordingly, full navigable access differs from full navigable access in the full access state in that the full access state places no restrictions on how much money can be spent, transferred, or deposited. Note that full navigable access for the limited access state does not disable, grey-out or hide any typically available features, the restrictions only apply when certain restricted actions are detected.

Figure 4:
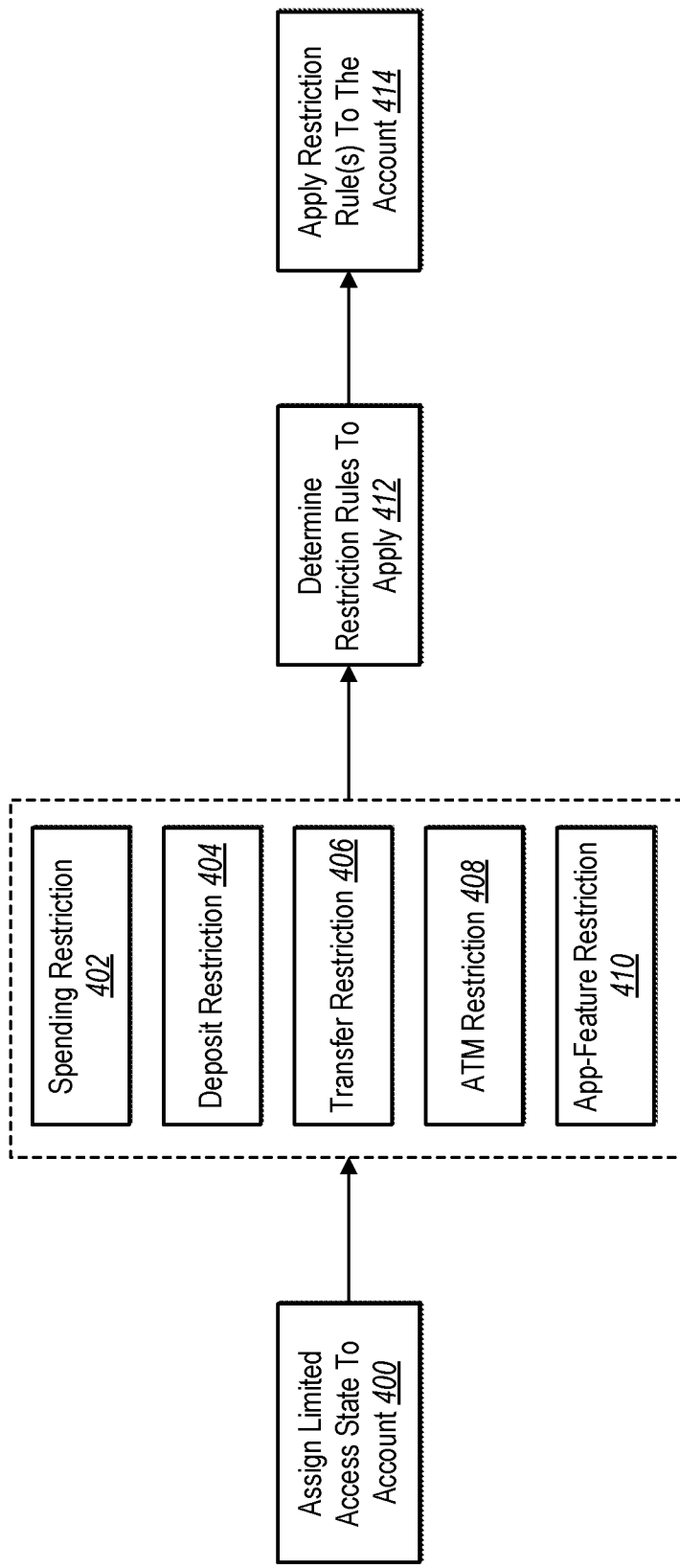
FIG. 4 illustrates an example diagram of the limited access tier system applying restriction rule(s) in accordance with one or more embodiments.

As discussed previously, the limited access tier system 102 applies restriction rules to the account corresponding with the triggering event. As illustrated in FIG. 4, after the limited access tier system 102 performs an act 400, the limited access tier system 102 applies restriction rules. For example, the act 400 includes assigning the limited access state to the account. In particular, the act 400 applies the same principles as those discussed above for acts 324, 328, and 336.

FIG. 4 subsequently illustrates, broad categories of restriction rules applied by the limited access tier system 102. For example, FIG. 4 shows spending restriction 402, deposit restriction 404, transfer restriction 406, ATM restriction 408, and app-feature restriction 410. In particular, FIG. 4 shows five categories of restriction rules in which the limited access tier system 102 can apply to the account assigned to the limited access state. To illustrate, the limited access tier system 102 can apply any combination of the specific rules within each broad category of restriction rules to the account assigned to the limited access state.

In one or more example embodiments, the spending restriction 402 includes limitations on the account assigned to the limited access state for credit transactions. In particular, the spending restriction 402 lowers the threshold credit limit available for the account assigned to the limited access state. To illustrate, a user of the account assigned to the limited access state can still transact in credit, however, the limited access tier system 102 lowers the amount allowed to be spent on credit. For example, the limited access tier system 102 in the full access state can allow a user of the account to make credit transactions of $200 per day, however for an account assigned to the limited access state, the limited access tier system 102 can limit the credit transactions to $50 per day.

In one or more example embodiments, the spending restriction 402 includes limitations on the account assigned to the limited access state for debit transactions. In particular, the spending restriction 402 lowers the threshold debit limit available for the account assigned to the limited access state. To illustrate, a user of the account assigned to the limited access state can make debit transactions, however the limited access tier system 102 restricts the amount allowed to be spent. For example, the limited access tier system 102 can limit the account assigned to the limited access state to $100 per day for debit transactions, whereas in some example embodiments for an account in the full access state there may be no debit transaction limitations. Note that for the credit and debit transaction limitations, these limitations vary from account to account depending on credit score, credit history, and numerous other factors. Both the credit and debit transaction limitations improve the efficiency of the limited access tier system 102 by still allowing for users of accounts corresponding with triggering events to transact but limiting the transaction amount temporarily to further prevent issues with fraudulent, illegal, or unusual activity.

In one or more example embodiments, the deposit restriction 404 includes limitations on the account assigned to the limited access state for ACH direct deposits. In particular, the deposit restriction 404 lowers the threshold amount allowed to be deposited within the account assigned to the limited access state for a certain period. To illustrate, the limited access tier system 102 allows a user of the account assigned to the limited access state to still make deposits within their account, however the amount is lowered. For example, in the full access state, limited access tier system 102 can allow for a direct deposit of $1000 per week, but in the limited access state the limited access tier system 102 can reduce that to $100 per week.

Furthermore, in one or more implementations, the deposit restriction 404 for direct deposits varies depending on the income of a user of the account. For example, a user of the account submits verification or documentation when creating their account as evidence of their salary. In doing so, the limited access tier system 102 determines a reasonable amount to be deposited each week within the user's account. In particular, deposits exceeding a certain threshold (based on salary) established by the limited access tier system 102 cause the limited access tier system 102 to determine a triggering event of suspicious activity. The deposit restriction 404 applied by the limited access tier system 102 improves upon efficiency by allowing for users of accounts to continue to make deposits, but the limited access tier system 102 limits the deposits to prevent further potentially suspicious activity. Because suspicious activity for deposits typically involves money laundering, the limited access tier system 102 assigning the limited access state to restrict the amount allowed to be deposited counters further potential money laundering (in large amounts) but does not completely prevent a user from making deposits.

In one or more example embodiments, the limited access tier system 102 applies transfer restriction 406. In particular, the transfer restriction 406 includes limiting the threshold amount for transferring to a co-user. To illustrate, the transfer restriction 406 of limiting transfers to co-user includes restricting the amount to $50 per month. For example, a user of the account in the limited access state can still utilize functions to transfer money to co-users, however if the user of the account in the limited access state attempts to exceed an established threshold amount for the limited access state (in this example $50), then the limited access tier system 102 prevents the transfer. If the transfer amount to a co-user is below the threshold amount, then the transfer is made.

In one or more example embodiments, the limited access tier system 102 applies transfer restriction 406 for transferring to another account associated with the same user that has an account in the limited access state. In particular, the limited access tier system 102 limits the amount threshold for transferring to another account associated with the same user that has an account in the limited access state. To illustrate, the limited access tier system 102 applies restriction rules to another account with an account identifier that the limited access tier system 102 recognizes as owned by the same user. For example, the limited access tier system 102 can restrict transfers to another account associated with the same user to $50 per month, while in one or more implementations an account in the full access state has no transfer restrictions. In applying the transfer restriction 406, the limited access tier system 102 improves efficiency by still allowing inter-account transfers for the same user but preventing a potential bad actor from using another account to carry out suspicious activity.

In one or more example embodiments, the limited access tier system 102 applies ATM restriction 408. In particular, the ATM restriction 408 includes a threshold limitation on ATM withdrawals. To illustrate, the limited access tier system 102 can set a threshold limitation on the amount for an ATM withdrawal, such as $25 per week. In the full access state, the limited access tier system 102 may have an ATM withdrawal threshold limitation of $500. When a user of the account in the limited access state performs an ATM withdrawal, the limited access tier system 102 allows the withdrawal to occur as long as the withdrawal is within the threshold limitation. As is mentioned above, restrictions such as the ATM withdrawal still provides for financial transaction capabilities for a user but prevents further potentially suspicious activity from occurring.

In one or more example embodiments, the limited access tier system 102 applies ATM restriction 408 based on time of day. In particular, the time of day limitation for ATM restriction 408 includes allowing a user of the account in the limited access state to make ATM withdrawals between business hours (8 a.m. to 5 p.m.). To illustrate, a user of the account in the limited access state can only make an ATM withdrawal if it is within the time period established by the limited access tier system 102. The limited access tier system 102 can also combine the above threshold limitation with the time of day limitation.

In one or more example embodiments, the limited access tier system 102 applies ATM restriction 408 based on geographic location. In particular, the geographic location limitation for ATM restriction 408 includes allowing a user of the account in the limited access state to make ATM withdrawals only in certain geographic locations. To illustrate, the limited access tier system 102 can establish approved geographic locations through account profile verification (e.g., address or place of business), or the limited access tier system 102 can flag certain geographic locations as impermissible. The limited access tier system 102 can combine the above threshold limitation and time of day limitation with the geographic location limitation for ATM restriction 408.

In one or more example embodiments, the limited access tier system 102 applies the app-feature restriction 410. In particular, the app-feature restriction 410 includes providing at the client device associated with the account in the limited access state articles tailored for the limited access state. To illustrate, the app-feature restriction of providing articles tailored for the limited access state includes presenting to the user of the account in the limited access state recommended articles or FAQ's. The recommended articles or FAQs relate to the limited access state when the user of the account in the limited access state accesses the client application. For example, the articles or FAQ's may include directions instructing the user of the account in the limited access state on how to restore the account to the full access state or specific details relating to restriction rules.

In one or more example embodiments, the limited access tier system 102 applies the app-feature restriction 410 for support. In particular, the app-feature restriction 410 for support includes tailoring customer support automated chat features. To illustrate, a user of the account in the limited access state can access a chat-bot for customer support purposes and the chat-bot can tailor messages to answer the user's questions pertaining to the limited access state. For example, the user of the account in the limited access state can inquire regarding credit limits and the chat-bot can provide the credit limit for the limited access state.

In one or more example embodiments, the limited access tier system 102 applies the app-feature restriction 410 for graphical user interface (GUI) features. In particular, the app-feature restriction 410 for GUI features includes changing the display of the GUI within the client application. To illustrate, the limited access tier system 102 displays for a user of the account in the limited access state via the client application a banner message that the account is in the limited access state. Additionally, the app-feature restriction 410 can include GUI changes when the user of the account in the limited access state makes financial transactions such as transferring money to a co-user. For example, in response to transferring money to a co-user, the limited access tier system 102 can display a message indicating the limitations associated with transferring to a co-user while in the limited access state.

As mentioned above, the limited access tier system 102 can selectively apply different combinations of the above-discussed restriction rules. For example, the limited access tier system 102 performs an act 412 of determining the restriction rules to apply. In particular, limited access tier system 102 determines the triggering event and then determines the restriction rules to apply. To illustrate, the limited access tier system 102 corresponds certain restriction rules with certain triggering events.

In one or more implementations, the limited access tier system 102 utilizes a machine learning model to determine which restriction rules to apply. In particular, the limited access tier system 102 can utilize the machine-learning model to determine which restriction rules to apply by inputting the triggering event(s) and activity of the account into the machine-learning model. For example, the machine-learning model can receive activities of an account and the triggering event(s) determined by the limited access tier system 102. In some instances, activities include transactions that involve a large amount of money, patterns of the account that deviate from normal, a high number of transactions within a short period, or any other actions that involve the account interacting with other accounts deemed suspicious. In particular, the limited access tier system 102 can utilize the machine-learning model to analyze the activity and the detected triggering event(s) to determine which restriction rules to apply. For example, the limited access tier system 102 can encode information associated with the activity and/or the triggering event(s) (e.g., using one hot encoding, an encoding layer, or a vector mapping) and then process the encoding utilizing the machine-learning model to generate corresponding restriction rules to apply for the account assigned to the limited access state.

As also shown in FIG. 4, after the limited access tier system 102 performs the act 412 of determining restriction rules to apply, the limited access tier system 102 can perform an act 414. In particular, the act 414 includes applying restriction rule(s) to the account. To illustrate, based on the act 412 of determining the restriction rules, the limited access tier system 102 applies the restriction rules to the account. The limited access tier system 102 applies the restriction rules by establishing restriction rules corresponding with an account identifier. For example, when a user of the account in the limited access state makes a transaction, the limited access tier system 102 receives a data package with the transaction data and the limited access tier system 102 determines corresponding restriction rules for the account in the limited access state. In doing so, the limited access tier system 102 utilizes the established parameters to allow certain actions that do not violate the restriction rules.

Figure 5:
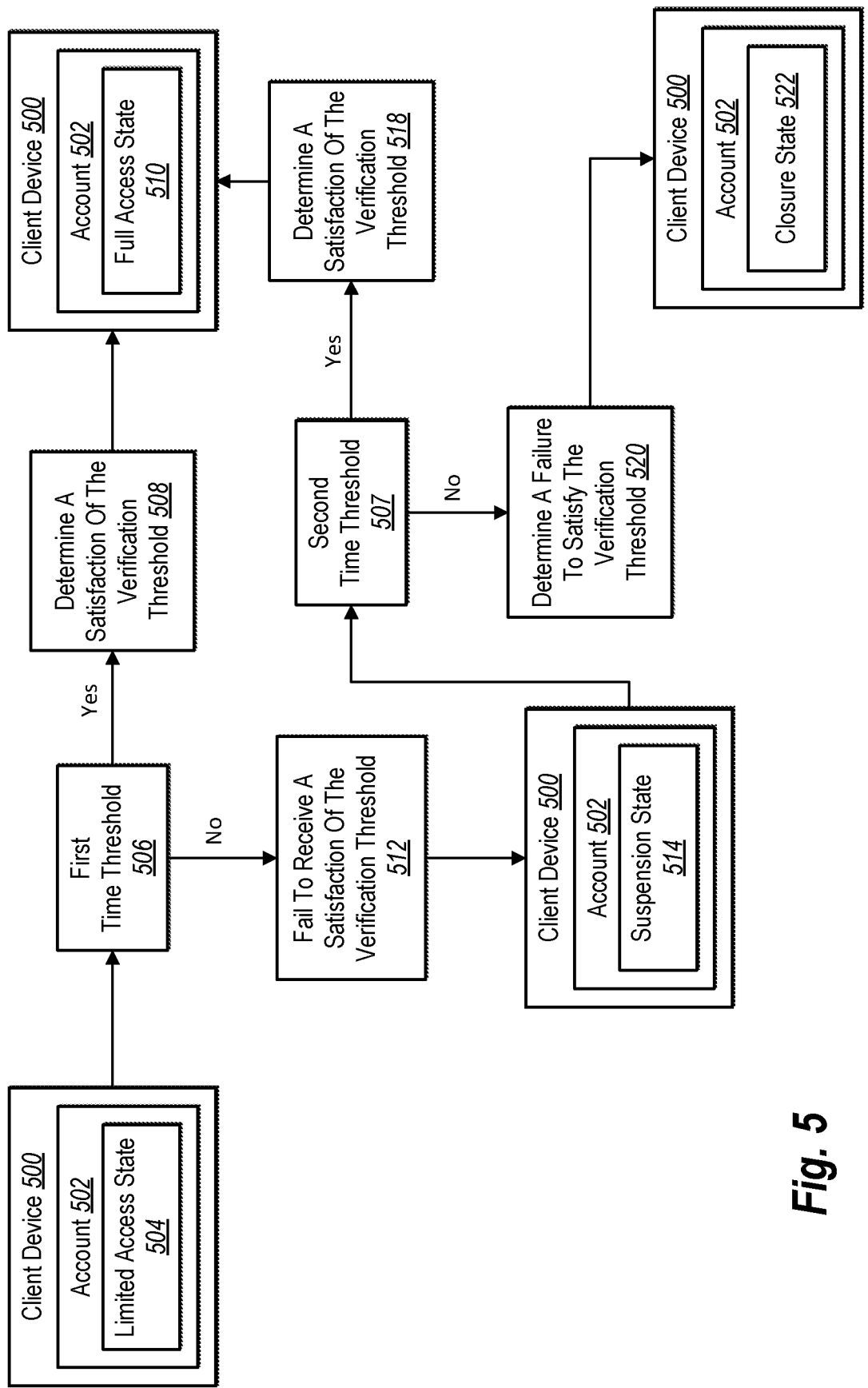
FIG. 5 illustrates an example diagram of the limited access tier system determining whether to reassign a full access state, a suspension state, or a closure state in accordance with one or more embodiments.

As mentioned above, the limited access tier system 102 associates time thresholds and verification thresholds with the limited access state. As illustrated in FIG. 5, the limited access tier system 102 can utilize different workflows depending on the satisfaction of thresholds. Specifically, FIG. 5 shows a client device 500 associated with an account 502 in the limited access state 504. In particular, the limited access tier system 102 associates a first time threshold 506 with the limited access state 504. To illustrate, the limited access tier system 102 utilizes the first time threshold 506 as representing a time period to satisfy a verification threshold. Furthermore, in one or more implementations the first time threshold 506 is less than or equal to 5 business days.

As shown in FIG. 5, the limited access tier system 102 performs different actions depending on whether the first time threshold 506 is satisfied. For example, as shown in FIG. 5, the "yes" workflow indicates that the first time threshold 506 is satisfied. In particular, the limited access tier system 102 performs an act 508 for determining whether the first time threshold 506 is satisfied. To illustrate, the act 508 includes determining a satisfaction of a verification threshold.

In one or more example embodiments, limited access tier system 102 establishes required documents for the act 508 of determining a satisfaction of a verification threshold. In particular, the limited access tier system 102 determines the activity corresponding with the triggering event to determine the required documents for satisfying a verification threshold. To illustrate, in one or more implementations, the limited access tier system 102 can require a passport document to satisfy the verification threshold.

As used herein, the term "verification threshold" in one or more implementations refers to an act (e.g., a verification action) performed within a client application. In particular, the verification threshold includes the limited access tier system 102 providing within the client application a prompt for a user of the client application to confirm information. For instance, the limited access tier system 102 can prompt the user to confirm their date of birth, their address, their name, or other related information. Further, the limited access tier system 102 can present within the client application a human confirmation verification (e.g., CAPTCHA), such as having the user of the client application select all instances of "a car" shown within a digital image shown on the graphical user interface within the client application. Moreover, the verification threshold can include providing one or more types of documents to the limited access tier system 102. The term verification threshold includes documentation thresholds.

As used herein, the term "documentation threshold" in one or more implementations refers to an established number or type of documents required that corresponds with a triggering event. In particular, the limited access tier system 102 establishes for certain triggering events different documentation thresholds. To illustrate, in response to a triggering event regarding a large direct deposit, the limited access tier system 102 can request the account corresponding to the triggering event to provide one legal document that proves a valid inheritance—e.g., the limited access tier system 102 establishes the one legal document as satisfying the documentation threshold. On the other hand, in response to a triggering event regarding a new account, the limited access tier system 102 can request the account corresponding to the triggering event to provide a photo identification and proof of address.

The following examples illustrate triggering events with a corresponding verification threshold determined by the limited access tier system 102. For example, the limited access tier system 102 can determine the triggering event as a large direct deposit within the account. In particular, a large direct deposit within the account can indicate possible money laundering. To illustrate, the limited access tier system 102 in response to a large direct deposit that indicates a triggering event can establish a verification threshold of providing one or more documents to prove the source of the money as legitimate. For example, the limited access tier system 102 can request documents such as inheritance documents, gift documents, investment documents, and bill of sale transactions.

In another example, the limited access tier system 102 can determine the triggering event as a large transfer of money to another account. In particular, a large transfer of money to another account can indicate illegal activity between accounts. To illustrate, the limited access tier system 102 in response to a large transfer of money that indicates a triggering event can establish a verification threshold of providing documents to prove the transfer as legitimate or to confirm specific information within a client application. For example, the limited access tier system 102 can request documents such as a bill of sale transaction, a contract agreement, a gift arrangement, and mortgage documents.

In another example, the limited access tier system 102 can determine the triggering event as a high spending amount for a credit account. In particular, a high spending amount for a credit account can indicate stolen account information or other fraudulent activity. To illustrate, the limited access tier system 102 in response to a high spending amount for a credit account indicating a triggering event can establish a verification threshold of providing documents to prove the spending as legitimate. For example, the limited access tier system 102 can request documents such as a bill of sale transaction, or a current photograph of the user of the account with an identification such as a driver's license. In other implementations, the limited access tier system 102 can merely send a push-notification to the account for confirmation as to the legitimacy of the high spending transaction(s).

In another example, the limited access tier system 102 can determine the triggering event as spending during an unusual time of the day or in an unusual location. Unusual in this context refers to a time of day not within a pattern of spending for the history of the user's account. Unusual for geographic location refers to a location not within the account information of the user, e.g., the documented address of the user. In particular, spending during an unusual time of the day or in an unusual geographic location can indicate stolen account information or other fraudulent activity. To illustrate, the limited access tier system 102 in response to spending during an unusual time of day indicating a triggering event, can establish a verification threshold of providing documents to prove the spending as legitimate. For example, the limited access tier system 102 can request documents such as a bill of sale transaction, a current photograph of the user of the account with an identification such as a driver's license, or merely a notification requiring confirmation of the geographic location or time of spending.

For the verification threshold, the limited access tier system 102 sends a verification request corresponding to the triggering event to the client device 500 associated with the account 502. As used herein, the term "verification request" in one or more implementations refers to the limited access tier system 102 notifying a user of the client device 500 to provide certain documentation or to verify information within the client application. In particular, the verification request includes a list of required documents indicated graphically or textually to the user of the client device. To illustrate, the verification request includes an in-application notification that the limited access tier system 102 requires legal documents relating to the most recent deposit, a picture identification, proof of address documents, paystubs, an offer letter, transaction receipts, and any other documents to dispel any suspicions surrounding an account.

As discussed above, for the act 508 of determining a satisfaction of the verification threshold, the limited access tier system 102 determines whether all required documents are received. For example, the limited access tier system 102 utilizes the established verification thresholds discussed above for the relevant triggering event. In particular, the limited access tier system 102 determines whether the required documents for the relevant triggering event was received and processes the received documents. To illustrate, for a large direct deposit, the limited access tier system 102 can establish one document as the verification threshold. Furthermore, the limited access tier system 102 can establish that confirming one piece of information within the client application also satisfies the verification threshold. The limited access tier system 102 receives documentation or verification from the account in the limited access state to prove the direct deposit as a legitimate inheritance. In receiving this documentation or verification, the limited access tier system 102 can determine the verification threshold as satisfied.

In one or more example embodiments, for the act 508, the limited access tier system 102 receives documents and sends them to an agent device. In particular, the limited access tier system 102 sends the received documents to the agent device for further processing. To illustrate, the further processing can involve the agent device determining whether the received documents or verification within the client application satisfies a verification threshold for a particular triggering event. If the agent device determines the received documents (and/or the verification within the client application) as satisfying a verification threshold, the agent device indicates to the limited access tier system 102 that the verification threshold is satisfied.

In one or more example embodiments, for the act 508, the limited access tier system 102 receives documents and utilizes a machine-learning model. In particular, the limited access tier system 102 processes the received documents in the machine-learning model to determine whether the documents satisfy the verification threshold. Machine-learning models were discussed above, and the same principles apply here. To illustrate, the machine-learning indicates to the limited access tier system 102 the legitimacy of the documents and whether a verification threshold has been satisfied.

As shown in FIG. 5, in response to the act 508 of determining the satisfaction of the verification threshold, the limited access tier system 102 restores the account. For example, the limited access tier system 102 restores the account from the limited access state 504 to a full access state 510. In particular, the limited access tier system 102 restores the account to the full access state 510 based on the act 508 of determining the satisfaction of the verification threshold within the first time threshold 506. To illustrate, the limited access tier system 102 can establish a time period of 5 days or less to submit documentation or to confirm information via the client application to prove the legitimacy of the direct deposit. In response to receiving verification that proves the legitimacy of the direct deposit within the 5-day threshold, the limited access tier system 102 restores the account to the full access state 510.

In one or more implementations, restoring to the full access state 510 includes removing all restriction rules applied to the account 502. In particular, the limited access tier system 102 corresponds an account identifier of the account 502 with the full access state 510. To illustrate, the limited access tier system 102 receives actions performed within the account 502 via the client device 500 (e.g., financial transactions) as data packages and does not call any restriction rules due to the full access state 510.

As discussed above, the limited access tier system 102 performs different actions depending on whether the first time threshold 506 is satisfied. As shown in FIG. 5, the "no" workflow indicates a failure to satisfy the first time threshold 506. For example, the limited access tier system 102 performs an act 512 for determining whether the first time threshold 506 is satisfied. To illustrate, the act 512 includes determining a failure to receive a satisfaction of the verification threshold.

As discussed above in relation to the verification threshold, in one or more example embodiments, limited access tier system 102 establishes required documents for the act 508 and the act 512 of determining a satisfaction of a verification threshold. In particular, based on the discussion above regarding required documents for a verification threshold, the limited access tier system 102 determines a failure to receive a satisfaction of the verification threshold if the limited access tier system 102 does not receive the required documents within the first time threshold 506. To illustrate, the limited access tier system 102 determines no documentation or verification within the client application was received for a large direct deposit that indicates a triggering event. Accordingly, the limited access tier system 102 performs the act 512 of determining a failure to receive a satisfaction of the verification threshold.

As shown in FIG. 5, based on the act 512 of determining a failure to satisfy the verification threshold within the first time threshold 506, the limited access tier system 102 assigns the account 502 to a suspension state 514. As used herein, the term "suspension state" 514 in one or more implementations refers to a state of the account that does not allow for any transactions such as transfers, deposits, or spending. In particular, a user associated with the account 502 can access the account 502 from the graphical user interface, however the limited access tier system 102 disables most/all functions, features, and actions (depending on the reason for suspension). To illustrate, the limited access tier system 102 greys-out all features for transferring money, depositing money, or spending, and notifies the user of the account 502 of the suspension. Moreover, the limited access tier system 102 can additionally provide instructions on how the user of the account can restore their account from the suspension state 514 to the full access state 510.

As shown in FIG. 5, the limited access tier system 102 associates a second time threshold 507 with the suspension state 514. For example, the limited access tier system 102 associates the second time threshold 507 with the suspension state 514 within which to satisfy the verification threshold. In particular, based on the account 502 providing documents to satisfy the second time threshold 507, the limited access tier system 102 either restores the account 502 to the full access state 510 or takes further action. To illustrate, the limited access tier system 102 associates the second time threshold 507 with the suspension state 514 as less than or equal to 30 days. If the account 502 submits documents and/or verifies information via the client application, satisfying the verification threshold within the established 30-day time threshold, then the limited access tier system 102 determines the second time threshold 507 as satisfied.

For example, as shown in FIG. 5, the limited access tier system 102 performs an act 518. In particular, the act 518 includes determining a satisfaction of the verification threshold. In particular, based on the above-discussed verification threshold requirements, if the limited access tier system 102 receives all required documents for a particular triggering event, then the limited access tier system 102 performs the act 518 of determining the verification threshold as satisfied. To illustrate, as shown in FIG. 5, in performing the act 518, the limited access tier system 102 restores the client device 500 to the full access state 510.

For example, as also shown in FIG. 5, the limited access tier system 102 can perform an act 520. In particular, the act 520 determines a failure to satisfy the verification threshold. To illustrate, the limited access tier system 102 determines that not all required documents (or a failure to verify all required information via the client application) for the verification threshold was received and performs the act 520. In doing so, the limited access tier system 102 assigns the client device 500 associated with the account 502 to a closure state 522. As used herein, the term "closure state" 522 in one or more implementations refers to a permanent shutting down of an account. In particular, closure state 522 includes the limited access tier system 102 removing the existence of the account 502 corresponding with the triggering event and not allowing for restoration of the account 502. To illustrate, the limited access tier system 102 does not reinstate the account 502 in the closure state 522 and a user of the account 502 in the closure state 522 must re-apply for the opening of a new account.

Although FIG. 5 illustrates time thresholds and verification thresholds established prior to assigning the account 502 to the closure state 522, in one or more implementations, the limited access tier system 102 immediately assigns the account 502 the suspension state 514. In particular, the limited access tier system 102 establishes certain triggering events as warranting an immediate suspension. To illustrate, violation of terms of use, activity that surpasses a fraud threshold, or a phone number of email associated with illegal or fraudulent activity are some examples that could cause the limited access tier system 102 to immediately assign the account 502 from the full access state 510 to the suspension state 514.

Furthermore, in one or more example embodiments, the limited access tier system 102 utilizes dynamic time thresholds. For example, FIG. 5 shows the first time threshold 506 and the second time threshold 507. In particular, the limited access tier system 102 can utilize models to dynamically adjust the time thresholds based on the detected triggering event corresponding with the account 502. To illustrate, the limited access tier system 102 can utilize a machine-learning model to determine a number of days for each of the first time threshold 506 and the second time threshold 507. The limited access tier system 102 utilizes the same machine-learning principles discussed above in the context of determining an appropriate time period for the time thresholds.

Figure 6A:
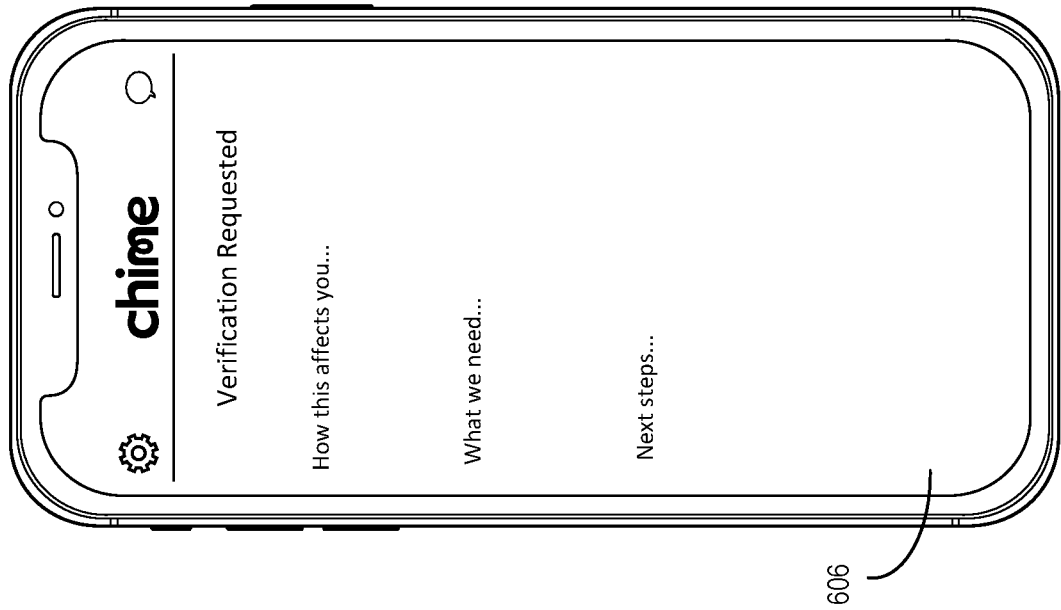
FIGS. 6A-6E illustrate an example graphical user interface on a client device relating to the account in a limited access state in accordance with one or more embodiments.
Figure 6A:
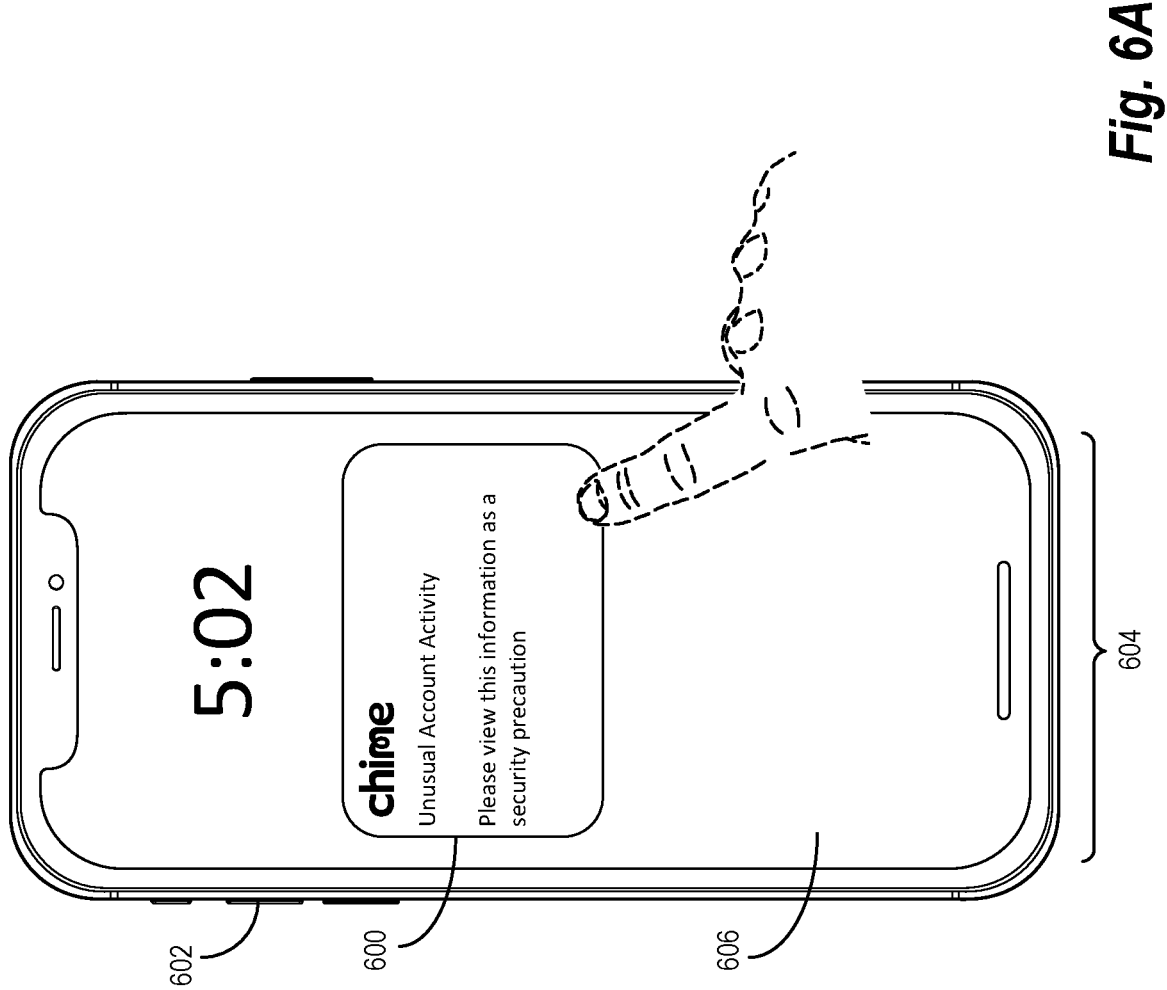

As discussed above, the limited access tier system 102 performs the act of providing notifications of the limited access state to the client device 500 associated with the account 502. For example, FIG. 6A illustrates a notification 600 provided to a client device 602 on a graphical user interface 606 via a client application 604. In particular, the limited access tier system 102 in response to detecting a triggering event sends the notification 600 to the client device 602. To illustrate, as shown in FIG. 6A, in one or more implementations, the notification 600 indicates to the client device that the account associated with the client device 602 is in a limited access state. FIG. 6A shows text that states: "Unusual account activity. Please view this information as a security precaution." As further shown in FIG. 6A, the limited access tier system 102 in response to a user of the client device 602 selecting the notification 600, the limited access tier system 102 causes the client device 602 to update the graphical user interface 606. For example, the graphical user interface 606 shows limitations placed on the account in the limited access state, required documents, and steps to submit the required documents.

Figure 6B:
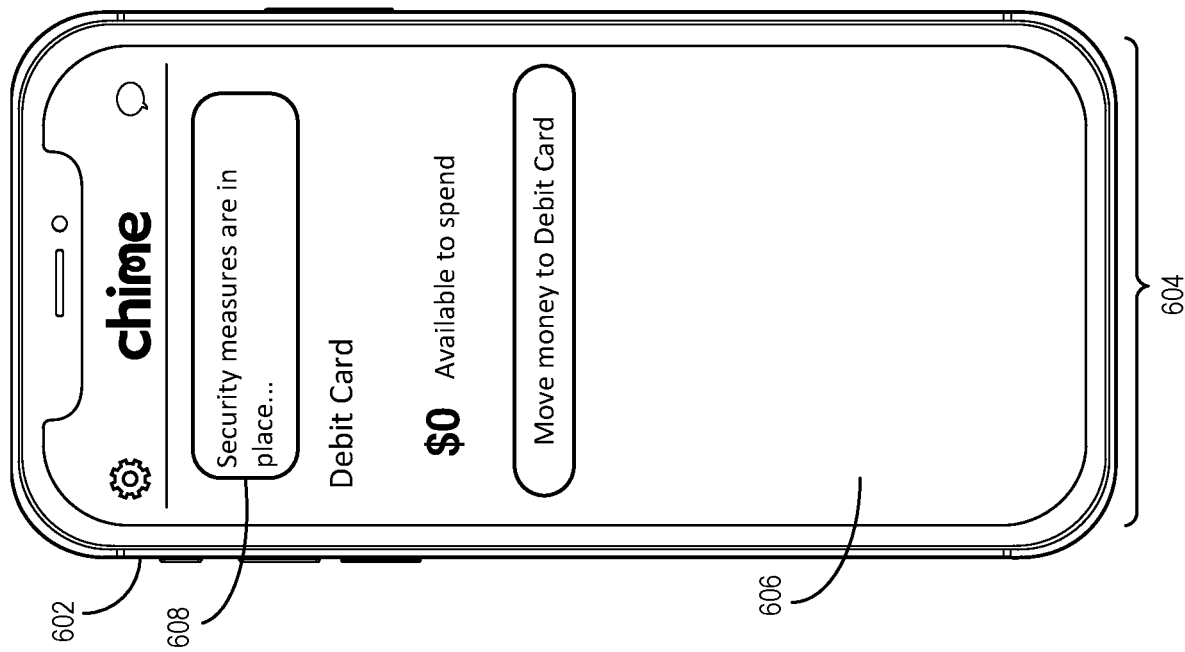

As also mentioned above, the limited access tier system 102 can provide a banner message to the client device 602. For example, FIG. 6B illustrates a banner message 608 provided to the client device 602 in the graphical user interface 606 via the client application 604. In particular, the banner message 608 provided to the client device 602 indicates that "security measures are in place . . . ." To illustrate, the banner message informs a user of the client device 602 that the account is assigned to the limited access state while the user is utilizing features such as viewing the credit account.

Figure 6C:
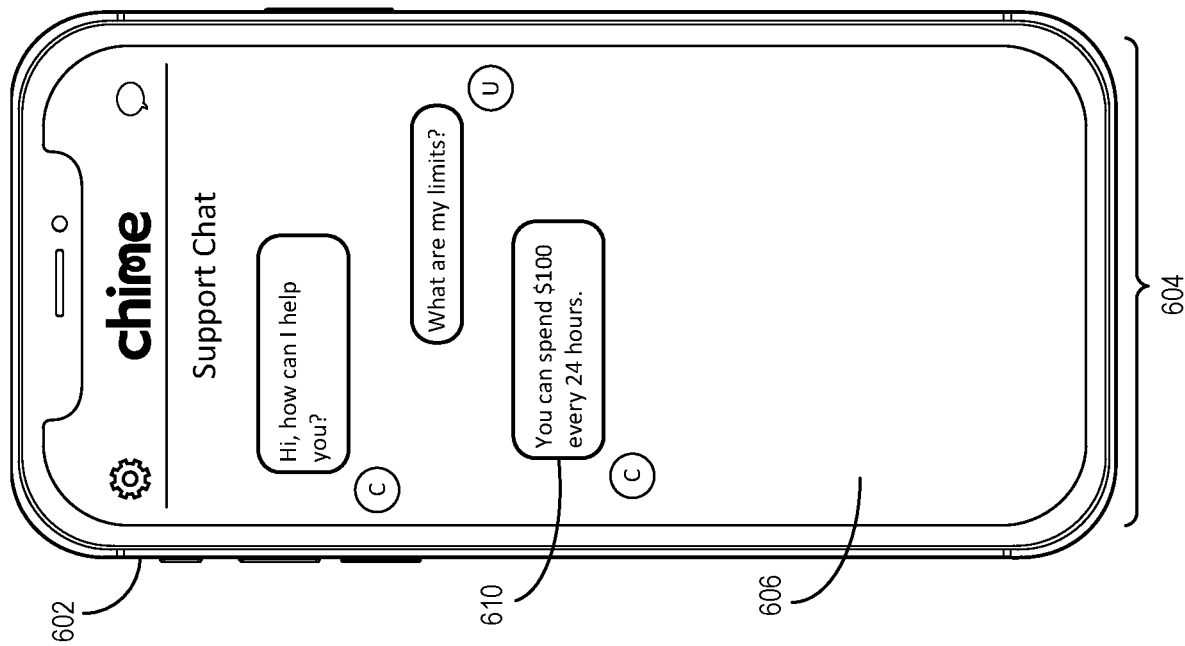

As also mentioned above, the limited access tier system 102 utilizes app-feature restriction rules within the support feature for accounts in the limited access state. For example, as shown in FIG. 6C, the limited access tier system 102 in the support chat (e.g., a chat bot) provides message(s) 610 tailored for the limited access state. In particular, FIG. 6C illustrates the client device 602 with graphical user interface 606 and shows a series of messages between a user of the client device 602 and support e.g., the chat bot. To illustrate, FIG. 6C shows the user of the account in the limited access state inquiring about limits to which support (chat bot) responds that the account in the limited access state can spend $100 every 24 hours.

Figure 6D:
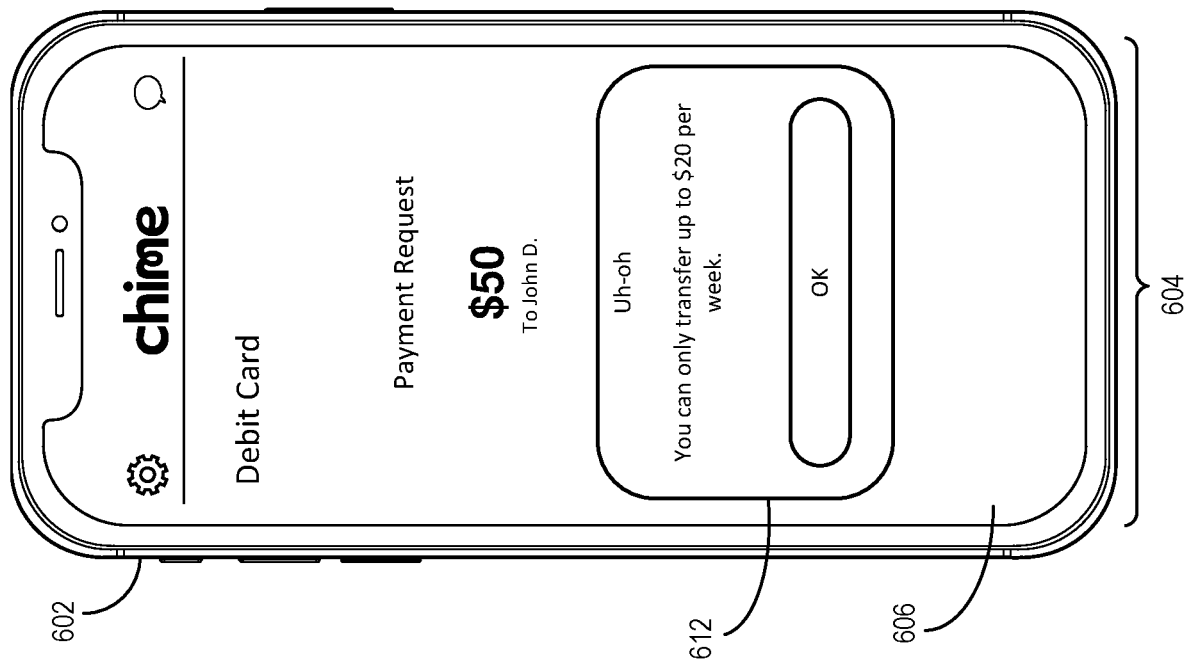

As also discussed, the limited access tier system 102 applies restriction rules for transferring between accounts or co-users. For example, FIG. 6D shows an in-app notification 612 on the graphical user interface 606 in response to an attempt to make a transfer to a co-user. In particular, FIG. 6D shows a payment transfer to John D. for $50 and the in-app notification 612. To illustrate, the in-app notification 612 indicates that the transfer threshold is restricted to $20 per week.

Figure 6E:
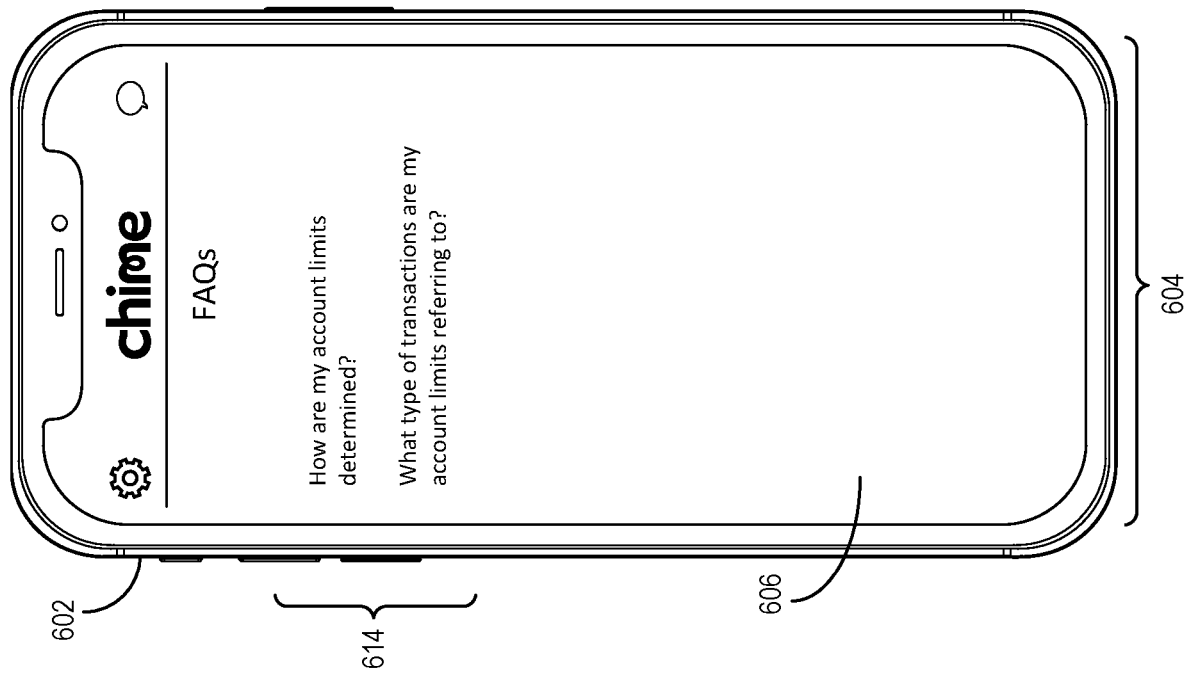

Moreover, as discussed above, the limited access tier system 102 can apply in-app restrictions such as changing the articles or FAQ's section for a user of the account in the limited access state. For example, FIG. 6E illustrates a graphical user interface 606 with headings 614 tailored for the limited access state. In particular, FIG. 6E shows, the graphical user interface 606 with the headings 614 "how are my account limits determined?" and "what type of transactions are my account limits referring to?" For each of the headings 614, the limited access tier system 102 causes the client device 602 to display via the graphical user interface 606 articles relevant to the limited access state. To illustrate, in response to a user of the client device 602 selecting one of the headings 614, the limited access tier system 102 receives an indication of the account's limited access state and provides an article for the heading relevant to the limited access state.

FIGS. 1-6, the corresponding text, and the examples provide a number of different systems, methods, and non-transitory computer readable media for assigning a limited access state to an account. In addition to the foregoing, embodiments can also be described in terms of flowcharts comprising acts for accomplishing a particular result. For example, FIG. 7 illustrates a flowchart of an example sequence of acts in accordance with one or more embodiments.

Figure 7:
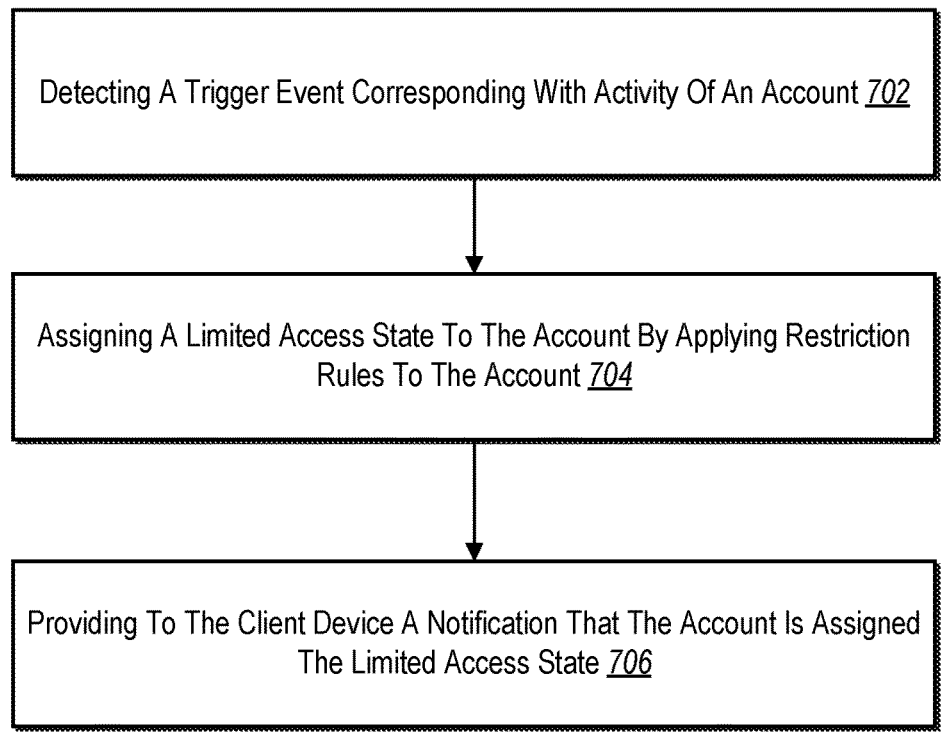
FIG. 7 illustrates an example series of acts for assigning a limited access state to the account in accordance with one or more embodiments.

While FIG. 7 illustrates acts according to some embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the acts described herein may be repeated or performed in parallel with one another or in parallel with different instances of the same or other similar acts.

FIG. 7 illustrates an example series of acts 700 for assigning a limited access state to an account. The series of acts 700 can include an act 702 of detecting a trigger event corresponding with activity of an account, an act 704 of assigning a limited access state to the account by applying restriction rules to the account, and an act 706 of providing to the client device a notification that the account is assigned the limited access state.

In particular, the series of acts 700 include detecting a triggering event corresponding with activity of an account associated with a client device, assigning, based on the triggering event, a limited access state to the account by applying restriction rules to the account that restricts usage of the account compared to a full access state, providing, to the client device associated with the account, a notification that the account is assigned the limited access state, wherein being assigned the limited access state causes the client device to: provide full navigable access to a client application; detect restricted activity based on the restriction rules; and provide a graphical element with an indication to perform actions to move the account from the limited access state to the full access state in response to detecting the restricted activity.

Further, in one or more embodiments, the series of acts 700 includes reassigning the full access state to the account from the limited access state by: sending a verification request corresponding to the triggering event to the client device associated with the account, processing a verification received in response to the verification request, determining the verification satisfies a verification threshold, and restoring the account to the full access state by deactivating the restriction rules. Additionally, in one or more embodiments, the series of acts 700 includes providing at least one of a direct upload option within a graphical user interface or a verification action within the graphical user interface. Moreover, in one or more embodiments, the series of acts 700 includes associating a first time threshold with the limited access state, the first time threshold representing a time period within which a verification threshold is to be satisfied, determining the verification threshold is satisfied within the first time threshold, and restoring the account from the limited access state to the full access state based on determining the verification threshold is satisfied within the first time threshold.

Further, in one or more embodiments, the series of acts 700 includes sending a reminder notification to the client device associated with the account, wherein the reminder notification indicates the first time threshold to satisfy the verification threshold. Additionally, in one or more embodiments, the series of acts 700 includes sending a verification request to the client device associated with the account that corresponds with the triggering event, associating a first time threshold with the limited access state, the first time threshold representing a time period within which a verification threshold is to be satisfied, determining the verification threshold was not satisfied within the first time threshold, and reassigning the account from the limited access state to a suspension state. Moreover, in one or more embodiments, the series of acts 700 includes associating a second time threshold with the suspension state within which to satisfy the verification threshold, and updating the state of the account from the suspension state to a closure state in response to determining the verification threshold was not satisfied within the second time threshold.

Further, in one or more embodiments, the series of acts 700 includes receiving a data package corresponding with activity of the account, and determining the activity of the account within the received data package indicates suspicious activity. Additionally, in one or more embodiments, the series of acts 700 detecting a new account that fails to satisfy a verification threshold. Moreover, in one or more embodiments, the series of acts 700 includes applying restriction rules to the account that comprise at least one of: reducing an inter-account transfer threshold for the account; reducing a machine withdrawal threshold for the account; reducing a credit spending threshold for the account; reducing a debit spending threshold for the account; or reducing feature capabilities within the client application.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
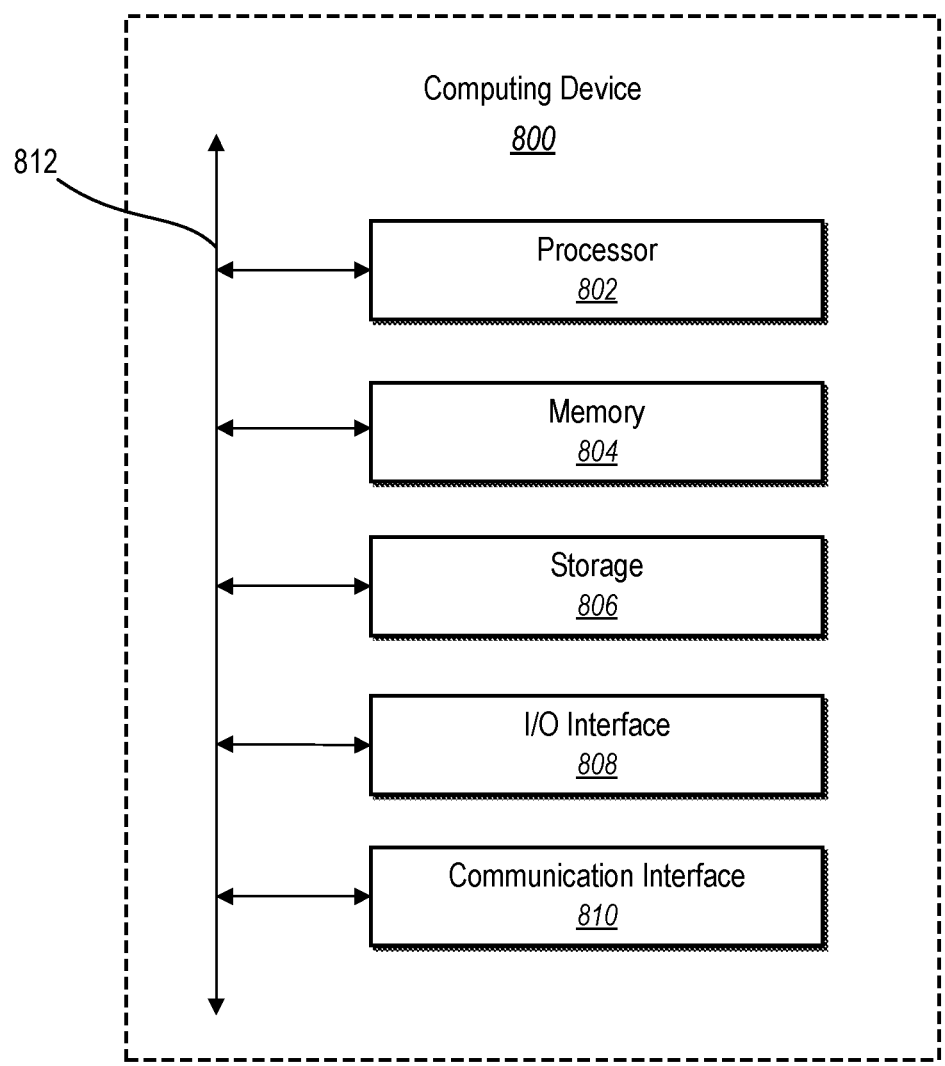
FIG. 8 illustrates a block diagram of a computing device for implementing one or more embodiments of the present disclosure.
Figure 9:
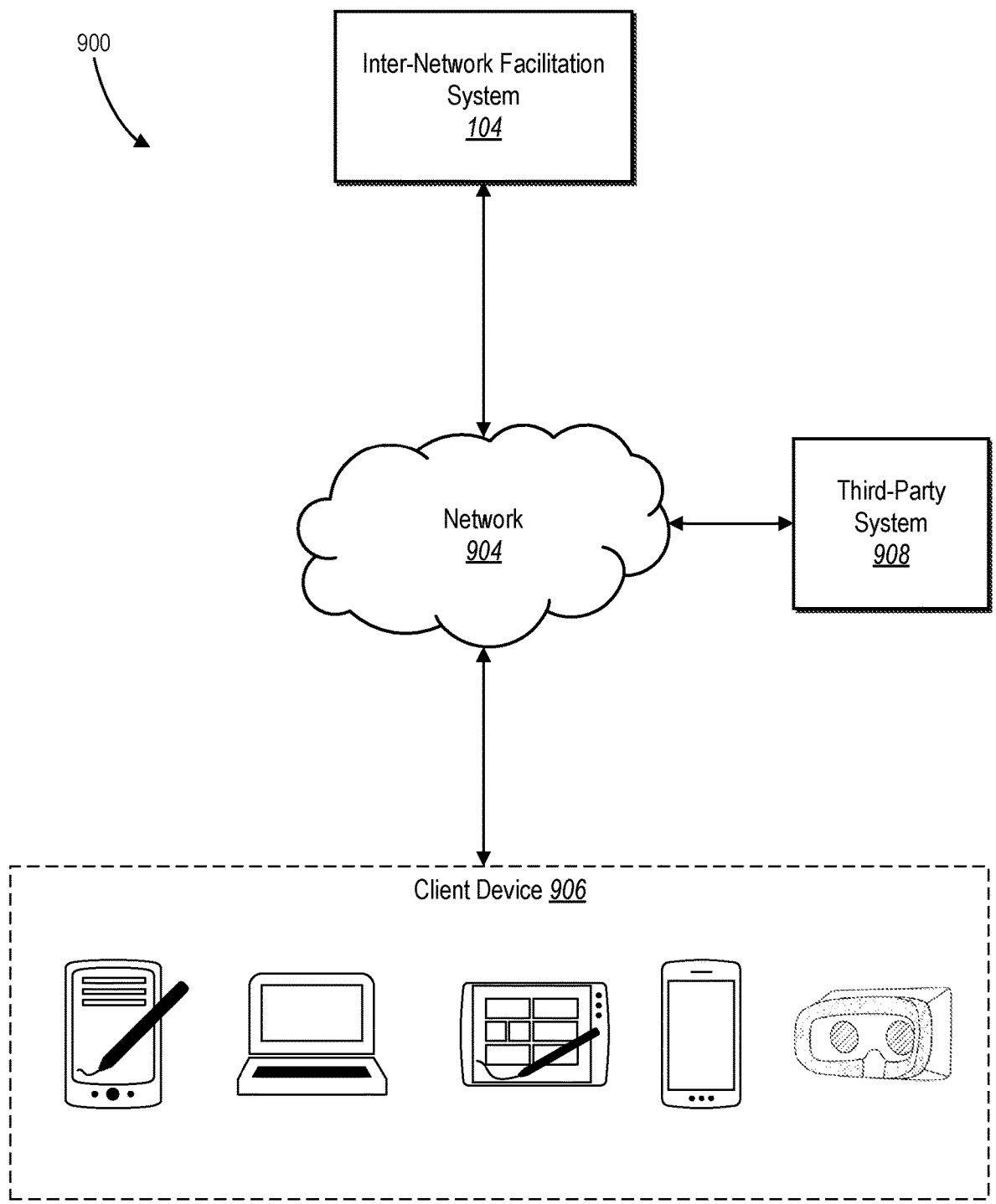
FIG. 9 illustrates an example environment for the limited access tier system in accordance with one or more embodiments.

FIG. 8 illustrates, in block diagram form, an exemplary computing device 800 (e.g., the client device 110, or the server(s) 106) that may be configured to perform one or more of the processes described above. As shown by FIG. 9, the computing device can comprise a processor 802, memory 804, a storage device 806, an I/O interface 808 interface 808, and a communication interface 810. In certain embodiments, the computing device 800 can include fewer or more components than those shown in FIG. 9. Components of computing device 800 shown in FIG. 9 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive ("HDD"), flash memory, a Universal Serial Bus ("USB") drive or a combination of these or other storage devices.

The computing device 800 also includes one or more input or output interface 808 interface 808 (or "I/O interface 808"), which are provided to allow a user (e.g., requester or provider) to provide input to (such as user strokes), receive output from, and otherwise transfer data to and from the computing device 800. These I/O interface 808 may include a mouse, keypad or a keyboard, a touch screen, camera, optical scanner, network interface, modem, other known I/O devices or a combination of such I/O interface 808. The touch screen may be activated with a stylus or a finger.

The I/O interface 808 may include one or more devices for presenting output to a user, including, but not limited to, a graphics engine, a display (e.g., a display screen), one or more output providers (e.g., display providers), one or more audio speakers, and one or more audio providers. In certain embodiments, interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that connects components of computing device 800 to each other.

FIG. 9 illustrates an example network environment 900 of the inter-network facilitation system 104. The network environment 900 includes a client device 906 (e.g., client device 110), an inter-network facilitation system 104, and a third-party system 908 connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 906, inter-network facilitation systems 104, third-party systems 908, and networks 904, this disclosure contemplates any suitable number of client devices 906, inter-network facilitation system 104, third-party systems 908, and networks 904. As an example, and not by way of limitation, network environment 900 may include multiple client device 906, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906 and third-party system 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 9. A client device 906 may enable a network user at the client device 906 to access network 904. A client device 906 may enable its user to communicate with other users at other client devices 906.

In particular embodiments, the client device 906 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party-system 908. For example, the inter-network facilitation system 104 may receive authentication credentials from a user to link a third-party system 908 such as an online bank account, credit account, debit account, or other financial account to a user account within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user account within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) across accounts of different third-party systems 908, and to present corresponding information via the client device 906.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 904.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   detecting a triggering event corresponding with activity of an account associated with a client device;
   assigning, based on the triggering event, a limited access state to the account by applying restriction rules to the account that restricts usage of the account compared to a full access state; and
   providing, to the client device associated with the account, a notification that the account is assigned the limited access state, wherein being assigned the limited access state causes the client device to:
   provide full navigable access to a client application;
   detect restricted activity based on the restriction rules; and
   provide a graphical element with an indication to perform actions to move the account from the limited access state to the full access state in response to detecting the restricted activity.

2. The computer-implemented method of claim 1, further comprises:
   reassigning the full access state to the account from the limited access state by:
   sending a verification request corresponding to the triggering event to the client device associated with the account;
   processing a verification received in response to the verification request;
   determining the verification satisfies a verification threshold; and
   restoring the account to the full access state by deactivating the restriction rules.

3. The computer-implemented method of claim 2, wherein sending the verification request to the client device associated with the account further comprises providing at least one of a direct upload option within a graphical user interface or a verification action within the graphical user interface.

4. The computer-implemented method of claim 1, further comprising:
   associating a first time threshold with the limited access state, the first time threshold representing a time period within which a verification threshold is to be satisfied;
   determining the verification threshold is satisfied within the first time threshold; and
   restoring the account from the limited access state to the full access state based on determining the verification threshold is satisfied within the first time threshold.

5. The computer-implemented method of claim 4, further comprising sending a reminder notification to the client device associated with the account, wherein the reminder notification indicates the first time threshold to satisfy the verification threshold.

6. The computer-implemented method of claim 1, further comprising:
   sending a verification request to the client device associated with the account that corresponds with the triggering event;
   associating a first time threshold with the limited access state, the first time threshold representing a time period within which a verification threshold is to be satisfied;
   determining the verification threshold was not satisfied within the first time threshold; and
   reassigning the account from the limited access state to a suspension state.

7. The computer-implemented method of claim 6, further comprising:
   associating a second time threshold with the suspension state within which to satisfy the verification threshold; and
   updating the state of the account from the suspension state to a closure state in response to determining the verification threshold was not satisfied within the second time threshold.

8. The computer-implemented method of claim 1, wherein detecting the triggering event further comprises:
  receiving a data package corresponding with activity of the account; and
  determining the activity of the account within the received data package indicates suspicious activity.

9. The computer-implemented method of claim 1, wherein detecting the triggering event further comprises detecting a new account that fails to satisfy a verification threshold.

10. The computer-implemented method of claim 1, wherein applying restriction rules further comprises applying restriction rules to the account that comprise at least one of:
  reducing an overall spending threshold for the account;
  reducing a direct deposit threshold for the account;
  reducing an inter-account transfer threshold for the account;
  reducing a machine withdrawal threshold for the account;
  reducing a credit spending threshold for the account;
  reducing a debit spending threshold for the account; or
  reducing feature capabilities within the client application.

11. A non-transitory computer-readable medium storing instructions that, when executed by at least one processor, cause a computer system to:
  detect a triggering event corresponding with activity of an account associated with a client device;
  assign, based on the triggering event, a limited access state to the account by applying restriction rules to the account that restricts usage of the account compared to a full access state; and
  provide, to the client device associated with the account, a notification that the account is assigned the limited access state, wherein being assigned the limited access state causes the client device to:
    provide full navigable access to a client application;
    detect restricted activity based on the restriction rules; and
    provide a graphical element with an indication to perform actions to move the account from the limited access state to the full access state in response to detecting the restricted activity.

12. The non-transitory computer-readable medium of claim 11, further comprises:
  reassigning the full access state to the account from the limited access state by:
    sending a verification request corresponding to the triggering event to the client device associated with the account;
    processing a verification received in response to the verification request;
    determining the verification satisfies a verification threshold; and
    restoring the account to the full access state by deactivating the restriction rules.

13. The non-transitory computer-readable medium of claim 12, wherein sending the verification request to the client device associated with the account further comprises providing a direct upload option within a graphical user interface.

14. The non-transitory computer-readable medium of claim 11, further comprises:
  sending a verification request to the client device associated with the account that corresponds with the triggering event;
  associating, a first time threshold with the limited access state, the first time threshold representing a time period within which a verification threshold is to be satisfied;
  determining the verification threshold was not satisfied within the first time threshold; and
  reassigning the account from the limited access state to a suspension state.

15. The non-transitory computer-readable medium of claim 14, further comprising sending a reminder notification to the client device associated with the account, wherein the reminder notification indicates the first time threshold to satisfy the verification threshold.

16. The non-transitory computer-readable medium of claim 11, wherein detecting the triggering event further comprises:
  receiving a data package corresponding with activity of the account; and
  determining the activity of the account within the received data package indicates suspicious activity.

17. A system comprising:
  at least one processor; and
  at least one non-transitory computer-readable storage medium storing instructions that, when executed by the at least one processor, cause the system to:
    detect a triggering event corresponding with activity of an account associated with a client device;
    assign, based on the triggering event, a limited access state to the account by applying restriction rules to the account that restricts usage of the account compared to a full access state; and
    provide, to the client device associated with the account, a notification that the account is assigned the limited access state, wherein being assigned the limited access state causes the client device to:
      provide full navigable access to a client application;
      detect restricted activity based on the restriction rules; and
      provide a graphical element with an indication to perform actions to move the account from the limited access state to the full access state in response to detecting the restricted activity.

18. The system of claim 17, further comprises:
  reassigning the full access state to the account from the limited access state by:
    sending a verification request corresponding to the triggering event to the client device associated with the account;
    processing a verification received in response to the verification request;
    determining the verification satisfies a verification threshold; and
    restoring the account to the full access state by deactivating the restriction rules.

19. The system of claim 18, further comprises:
  associating a first time threshold with the limited access state, the first time threshold representing a time period within which a verification threshold is to be satisfied;
  determining the verification threshold is satisfied within the first time threshold; and
  restoring the account from the limited access state to the full access state based on determining the verification threshold is satisfied within the first time threshold.

20. The system of claim 18, wherein sending the verification request to the client device associated with the account further comprises providing a direct upload option to the client device within a graphical user interface.

\* \* \* \* \*